United States Patent
Park et al.

(10) Patent No.: US 10,488,514 B2
(45) Date of Patent: Nov. 26, 2019

(54) SIGNAL PROCESSING METHOD OF RAW DATA OBTAINED BY USING CHIRP SUB-BOTTOM PROFILER AND READABLE STORAGE MEDIUM STORING THE METHOD

(71) Applicant: KOREA INSTITUTE OF GEOSCIENCE AND MINERAL RESOURCES, Daejeon (KR)

(72) Inventors: Chan Ho Park, Hanam-si (KR); Won Sik Kim, Daegu (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 0 days.

(21) Appl. No.: 16/169,205

(22) Filed: Oct. 24, 2018

(65) Prior Publication Data

US 2019/0137640 A1    May 9, 2019

(30) Foreign Application Priority Data

Nov. 7, 2017  (KR) .................. 10-2017-0147470

(51) Int. Cl.
| | | |
|---|---|---|
| *G01S 15/89* | (2006.01) | |
| *G01V 1/38* | (2006.01) | |
| *G01S 15/88* | (2006.01) | |

(52) U.S. Cl.
CPC .............. *G01S 15/89* (2013.01); *G01S 15/88* (2013.01); *G01V 1/3808* (2013.01); *G01V 2210/1427* (2013.01)

(58) Field of Classification Search
CPC ....... G01S 15/89; G01S 15/88; G01V 1/3808; G01V 2210/1427
See application file for complete search history.

(56) References Cited

U.S. PATENT DOCUMENTS

| | | | |
|---|---|---|---|
| 8,305,840 B2* | 11/2012 | Maguire ................. | G01S 15/89 367/88 |
| 9,244,168 B2* | 1/2016 | Proctor ............... | G01S 15/8902 |

(Continued)

FOREIGN PATENT DOCUMENTS

| | | |
|---|---|---|
| KR | 10-1416278 B1 | 7/2014 |
| KR | 10-1544829 B1 | 8/2015 |
| KR | 10-1564094 B1 | 10/2015 |

OTHER PUBLICATIONS

Gutowski et al., "Chirp sub-bottom profiler source signature design and field testing", Marine Geophysical Researches, vol. 23, pp. 481-492 (Year: 2002).*

(Continued)

*Primary Examiner* — Ian J Lobo
(74) *Attorney, Agent, or Firm* — Hauptman Ham, LLP

(57) ABSTRACT

Provided is method of signal processing of raw data obtained using a chirp sub-bottom profiler. The method includes transmitting a chirplet (minimum frequency: initial first frequency, maximum frequency: initial second frequency, pulse length: initial pulse length) to survey target strata using a chirp sub-bottom profiler and acquiring raw data reflected and received from a target object, correcting the raw data, generating a comparison chirplet using a sub-bottom reflection signal of the raw data, cross-correlating the corrected raw data with the comparison chirplet to generate a first Klauder wavelet section, auto-correlating the comparison chirplet to generate a second Klauder wavelet, and deriving a physical property of the survey target strata by deconvoluting the first Klauder wavelet section and the second Klauder wavelet.

11 Claims, 37 Drawing Sheets

(56) References Cited

U.S. PATENT DOCUMENTS

2013/0242696 A1 9/2013 van Groenestijn et al.
2016/0299244 A1* 10/2016 Kim ..................... G01V 1/364

OTHER PUBLICATIONS

Henkart, "Chirp sub-bottom Profiler Processing—A review" https://www.ideo.columbia.edu/res/pi/MB-System/sonarfunction/20061001HenkartChirpSubbottom.pdf, 3 pp (Year: 2006).*

* cited by examiner

SIGNAL PROCESSING METHOD OF RAW DATA OBTAINED BY USING CHIRP SUB-BOTTOM PROFILER AND READABLE STORAGE MEDIUM STORING THE METHOD

CROSS-REFERENCE TO RELATED APPLICATIONS

This U.S. non-provisional patent application claims priority under 35 U.S.C. § 119 of Korean Patent Application No. 10-2017-0147470, filed on Nov. 7, 2017, the entire contents of which are hereby incorporated by reference.

BACKGROUND

The present disclosure herein relates to a signal processing method of raw data obtained using a chirp sub-bottom profiler.

Unlike strata exposed to the surface, the sub-bottom has physical limitations in exploration. Therefore, sub-bottom exploration is mainly based on seismic surveys. In the seismic exploration, reflections or refractions that occur when the seismic signal artificially generated at the water reaches the sub-bottom are detected by a geophone, and the sensed signal is analyzed to analyze the sub-bottom. That is, by analyzing the detected signals, it is possible to probe the resources existing in the seabed such as oil, natural gas and gas hydrate, or to explore submarine cables, storage facilities, bridges and wrecks.

The seismic waves used in the sub-bottom may be roughly divided into low-frequency exploration and high-frequency exploration.

In the low-frequency exploration, there is a problem that the penetration of strata is higher than that of high frequency exploration, but the resolution of the data is low. Conversely, in the high-frequency exploration, there is a problem that the resolution of the data is higher than that of the low frequency probe, but the penetration of strata is low.

Therefore, strata exploration, located at a depth of several kilometers, uses a large-capacity air-gun that generates low frequencies, and strata exploration, located at relatively shallow water depths, uses small-volume air guns, boomers, multi-beams, side scan sonar, and chirp sub-bottom profiler (SBP).

Unlike other sound sources that use a single frequency, the dual chirp sub-bottom profiler uses a multi-frequency sound source that transmits and modulates frequencies from several kHz to several tens of kHz. That is, the multi-frequency sound source used in the chirp sub-bottom profiler has an advantage that it may grasp and analyze the high frequency band and the low frequency band relatively low at a time.

The chirp sub-bottom profiler emits a chirplet, that is, a signal that increases at low frequencies to high frequencies. The length of the chirplet is very short, ranging from several milliseconds to several tens of milliseconds, so that an anomaly of several tens cm or less may be distinguished.

However, since such chirp sub-bottom profiler also uses high frequency signals, as compared with the case of using a low-frequency signal, there are many problems that the impact of the marine environment is large, and when the signal is propagating to the medium, it becomes longer and a waveform distortion such as a change in amplitude and frequency occurs, and signal overlapping, noise, and the like occur greatly.

Also, because the chirp sub-bottom profiler uses a multi-frequency sound source that is modulated rather than a single-frequency sound source, it is difficult to process data. As such, due to the difficulty of processing chirp sub-bottom profiler data, conventionally, after performing a preprocessing process and a signal processing process to increase the S/N ratio, it is converted into an envelope type in which the energy intensity may be grasped and then, analyzed.

In such a manner, the method of converting the obtained data into the envelope form and analyzing it does not know the quantitative physical property information of the sub-bottom.

Therefore, in relation to the sub-bottom analysis method using the chirp sub-bottom profiler, there is a need for a data processing method capable of minimizing the effects of waveform distortion and simultaneously obtaining quantitative physical property information.

SUMMARY

The present disclosure is to provide a signal processing method of raw data obtained using a chirp sub-bottom profiler, and is to provide a signal processing method capable of solving the problem of waveform distortion occurring when a sub-bottom exploration is performed using a high frequency signal.

In addition, the present disclosure is to provide a signal processing method capable of inversely quantifying physical property information of a sub-bottom from raw data obtained using a chirp sub-bottom profiler.

An embodiment of the inventive concept provides a method of signal processing of raw data obtained using a chirp sub-bottom profiler, the method including: (a) transmitting a chirplet (minimum frequency: initial first frequency, maximum frequency: initial second frequency, pulse length: initial pulse length) to survey target strata using a chirp sub-bottom profiler and acquiring raw data reflected and received from a target object; (b) correcting the raw data; (c) generating a comparison chirplet using a sub-bottom reflection signal of the raw data; (d) cross-correlating the corrected raw data with the comparison chirplet to generate a first Klauder wavelet section; (e) auto-correlating the comparison chirplet to generate a second Klauder wavelet; and (f) deriving a physical property of the survey target strata by deconvoluting the first Klauder wavelet section and the second Klauder wavelet.

In an embodiment, the generating of the comparison chirplet may use a sub-bottom reflection signal in a trace area where anomaly does not exist.

In an embodiment, the generating of the comparison chirplet may include: (1) setting a first frequency band for selecting a minimum frequency, a second frequency band for selecting a maximum frequency, and a pulse length range for selecting a pulse length, which are variables necessary for generating a comparison chirplet; (2) setting one selected from the first frequency band as a minimum frequency, generating, by each minimum frequency, a plurality of different first artificial chirplets (maximum frequency: initial second frequency, pulse length: initial pulse length), cross-correlating at least one trace of the raw data with the plurality of first artificial chirps, and selecting an average value of a frequency corresponding to a maximum value of an envelope obtained by the Hilbert transform as a comparison first frequency; (3) setting one selected from the second frequency band as a maximum frequency, generating, by each maximum frequency, a plurality of different second artificial chirplets (minimum frequency: comparison first frequency, pulse length: initial pulse length), cross-correlating at least one trace of the raw data with the plurality of second artificial chirps, and selecting an average value of a frequency corresponding to a maximum value of an envelope obtained by the Hilbert transform as a comparison second frequency; (4) setting one selected from the pulse length range as a pulse length, generating, by each pulse length, a plurality of different third artificial chirplets (minimum frequency: comparison first frequency, maximum frequency: comparison second frequency), cross-correlating at least one trace of the raw data with the plurality of third artificial chirps, and selecting an average of a pulse length corresponding to a maximum value of an envelope obtained by the Hilbert transform as a comparison pulse length; and (5) generating a comparison chirplet having the comparison first frequency, the comparison second frequency, and the comparison pulse length as a minimum frequency, a maximum frequency, and a pulse length, respectively.

In an embodiment, the generating of the comparison chirplet may include: (1) setting a first frequency band for selecting a maximum frequency, a second frequency band for selecting a minimum frequency, and a pulse length range for selecting a pulse length, which are variables necessary for generating a comparison chirplet; (2) setting one selected from the first frequency band as a maximum frequency, generating, by each maximum frequency, a plurality of different first artificial chirplets (minimum frequency: initial first frequency, pulse length: initial pulse length), cross-correlating at least one trace of the raw data with the plurality of first artificial chirps, and selecting an average value of a frequency corresponding to a maximum value of an envelope obtained by the Hilbert transform as a comparison first frequency; (3) setting one selected from the second frequency band as a minimum frequency, generating, by each minimum frequency, a plurality of different second artificial chirplets (maximum frequency: comparison first frequency, pulse length: initial pulse length), cross-correlating at least one trace of the raw data with the plurality of second artificial chirps, and selecting an average value of a frequency corresponding to a maximum value of an envelope obtained by the Hilbert transform as a comparison second frequency; (4) setting one selected from the pulse length range as a pulse length, generating, by each pulse length, a plurality of different third artificial chirplets (maximum frequency: comparison first frequency, minimum frequency: comparison second frequency), cross-correlating at least one trace of the raw data with the plurality of third artificial chirps, and selecting an average of a pulse length corresponding to a maximum value of an envelope obtained by the Hilbert transform as a comparison pulse length; and (5) generating a comparison chirplet having the comparison first frequency, the comparison second frequency, and the comparison pulse length as a maximum frequency, a minimum frequency, and a pulse length, respectively.

In an embodiment, the physical property may be a reflection coefficient obtained through Sparse-Spike Deconvolution.

In an embodiment, the method may further include inversing an impedance of each sub-bottom from the reflection coefficient and Equation 1 below.

$$Z_{n+1} = Z_n * ((1+R_n)/(1-R_n))$$ [Equation 1]

(where $Z_1$ is an impedance of the seawater layer, $Z_n$ is an impedance of a sub-bottom located at the nth position with respect to the sub-bottom, and $R_n$ is a reflection coefficient of a sub-bottom located at the nth position with respect to the sub-bottom)

In an embodiment, the correcting of the raw data may be performed including at least one of Highpass filtering, amplitude normalization, and automatic gain control (AGC).

In an embodiment, the method may further include correcting an influence of waviness with respect to the first Klauder wavelet section, wherein the correcting of the influence of the waviness may include: extracting an arbitrary trace having no anomaly and cross-correlating with another trace to generate an initial peaking line; calculating a moving average value for the initial peaking line to generate a latter peaking line; and comparing the initial peaking line with the latter peaking line to move the initial peaking line based on the latter peaking line.

In an embodiment, the method may further include performing muting to correct a value of an upper zone of the latter peaking line to zero.

In an embodiment, the method may further include, when a generation variable of the comparison chirplet has a minimum frequency as a comparison first frequency, a maximum frequency as a second comparison frequency, and a pulse length of a comparison pulse, setting the comparison first frequency as f1, the initial first frequency as f2, the initial second frequency as f3, and the comparison second frequency as f4, and performing band pass filtering to block signals of a frequency band of f1 or less and f4 or more and passing signals of a frequency band between f2 and f4.

In an embodiment of the inventive concept, a non-transitory computer readable recording medium for storing a method according to any one of claims 1 to 10 to perform signal processing of raw data acquired using a chirp sub-bottom profiler.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

In the following description of the present invention, a detailed description of known functions and configurations incorporated herein will be omitted when it may obscure the subject matter of the present invention.

Figure 1:
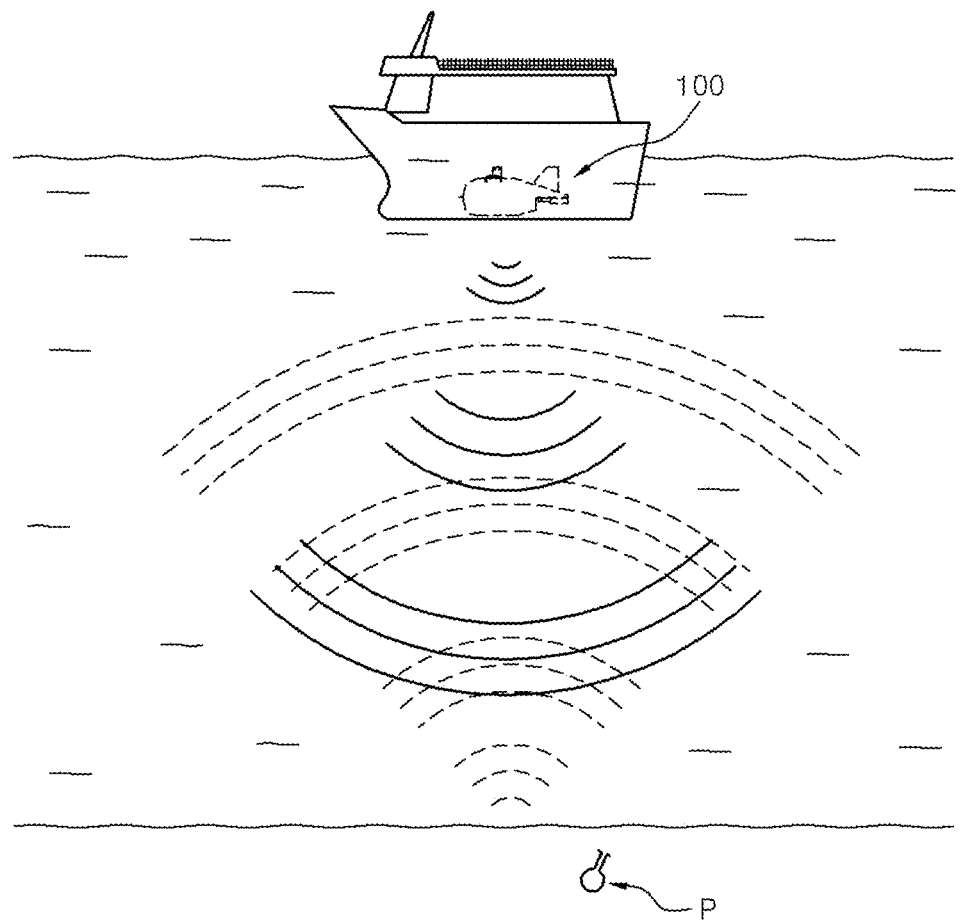
FIG. 1 is a schematic diagram illustrating an exploration using a Chirp sub-bottom profiler.
Figure 2:
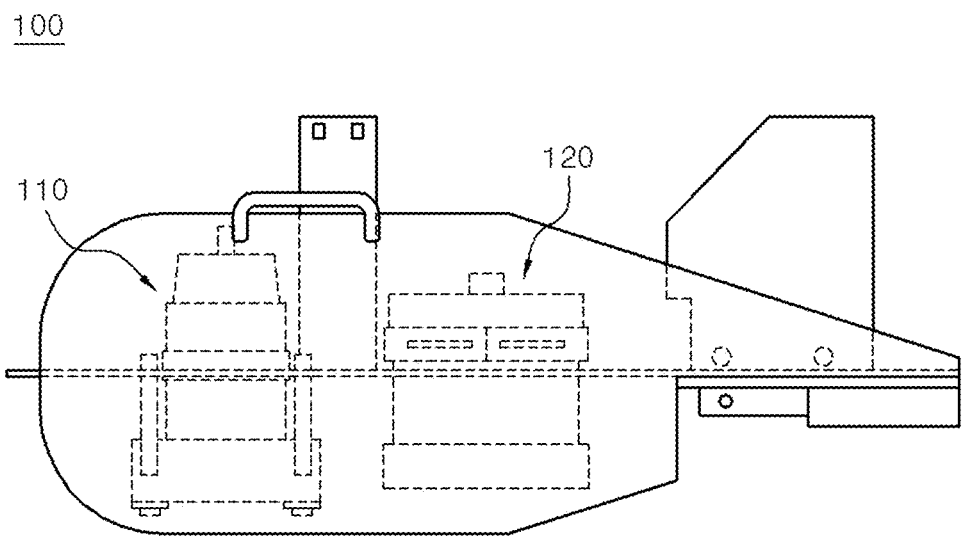
FIG. 2 schematically shows a cross-sectional view of a chirp sub-bottom profiler.

FIG. 1 is a schematic diagram illustrating an exploration using a Chirp sub-bottom profiler, and FIG. 2 schematically shows a cross-sectional view of a chirp sub-bottom profiler.

Referring to FIG. 1, probes running in the ocean are equipped with a chirp sub-bottom profiler 100 that emits a chirp signal.

The chirp sub-bottom profiler 100 is equipped with an oscillator 110 and a geophone 120.

The oscillator 110 transmits a chirp signal at a predetermined interval dt according to the controller's control, and the transmitted signal is reflected from the submarine surface or the sub-bottom interface, and is transmitted to the geophone 120. The transmitted chirp signal is assigned with a shot number ns at a certain time interval. In other words, the chirp sub-bottom profiler 100 may be used to analyze the physical properties of marine strata and to identify the anomaly P using chirp signals.

Figure 3:
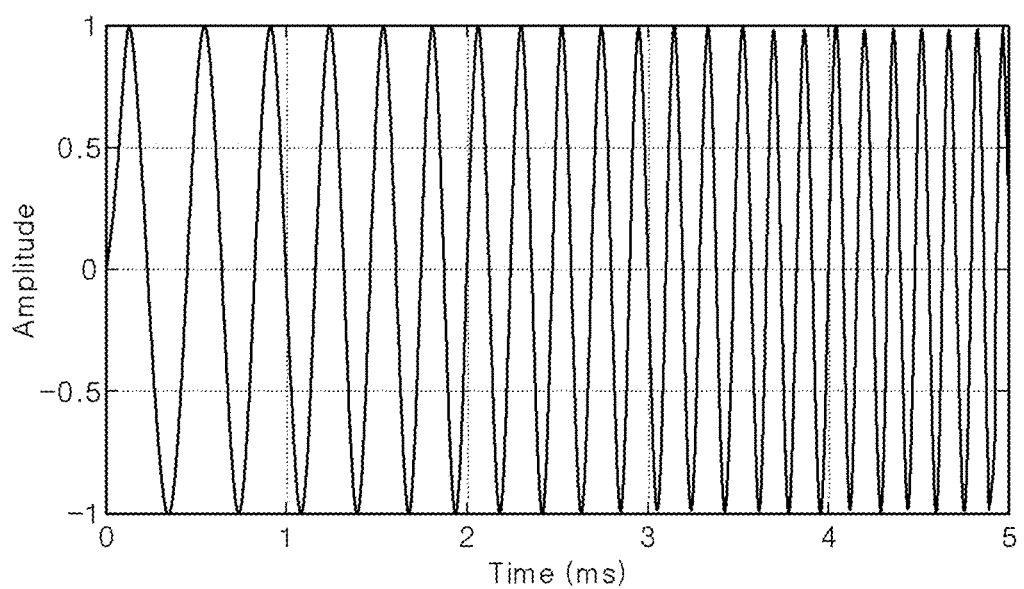
FIGS. 3 to 5 show measurement data acquired using the wave form of a single wave signal, a Klauder wavelet obtained by auto-correlating a single wave signal, and a single wave signal, respectively.
Figure 4:
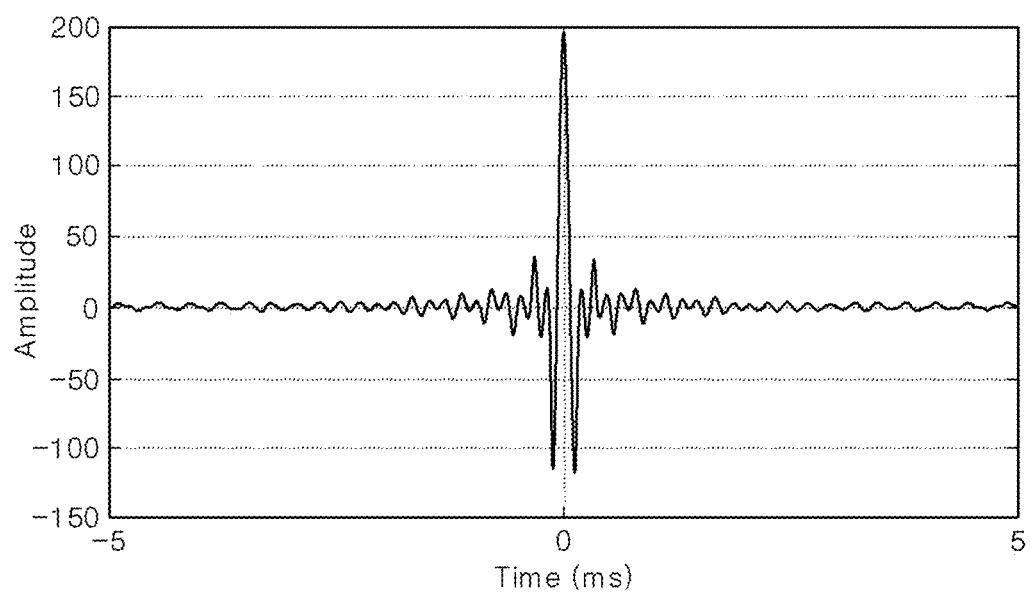
Figure 5:
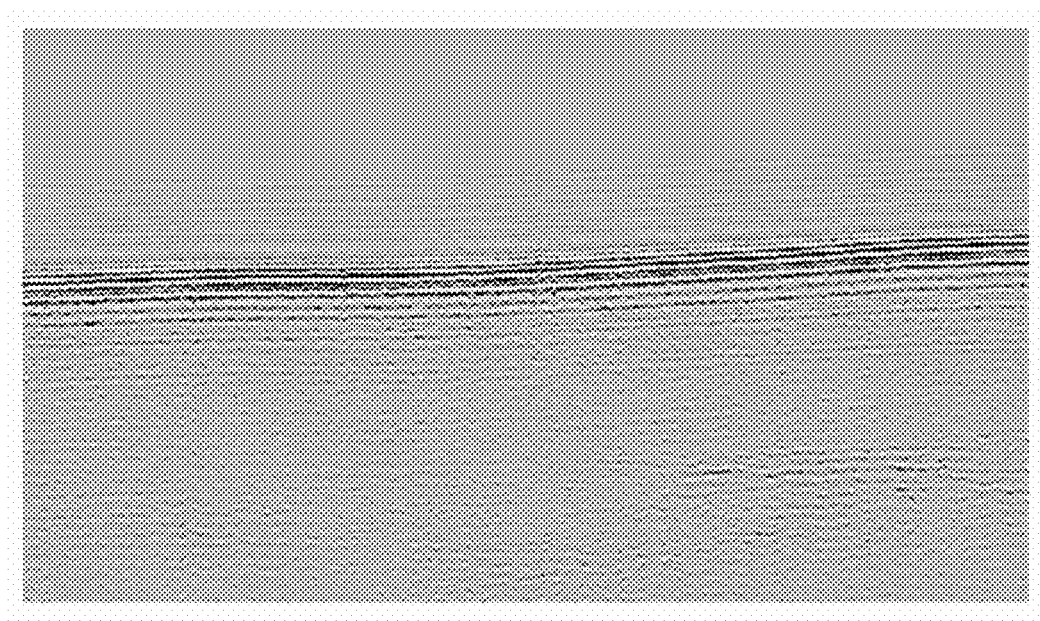

A conventional air gun or the like generates a signal without frequency modulation as shown in FIG. 3 to perform a sub-bottom exploration. In this case, as shown in FIG. 4, the waveform of the Klauder wavelet obtained after auto-correlation is not clear, and a plurality of side lobes are observed. According to a number of papers, such side lobes are seen to be due to the effects of ringing, artifact generation, and reflection amplitude. When there are many side lobes, as shown in FIG. 5, there is a problem that ringing occurs in the measurement data and the reflection amplitude is not clear.

In order to solve such a problem, the present inventor uses a chirp signal.

Figure 6:
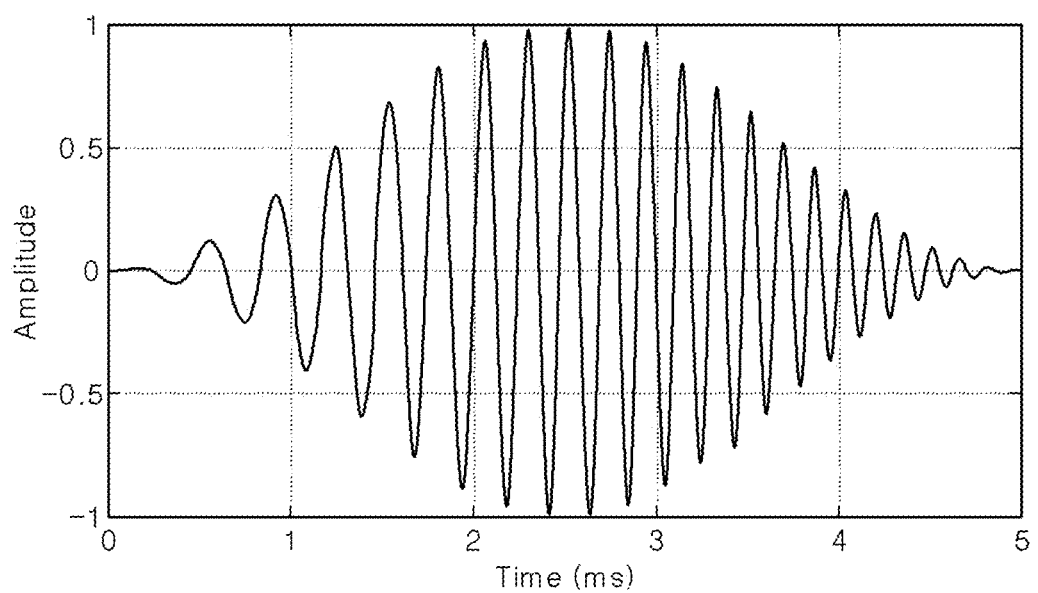
FIGS. 6 to 8 show measurement data acquired using the wave form of a chirp signal, a Klauder wavelet obtained by auto-correlating a chirp signal, and a chirp signal, respectively.
Figure 7:
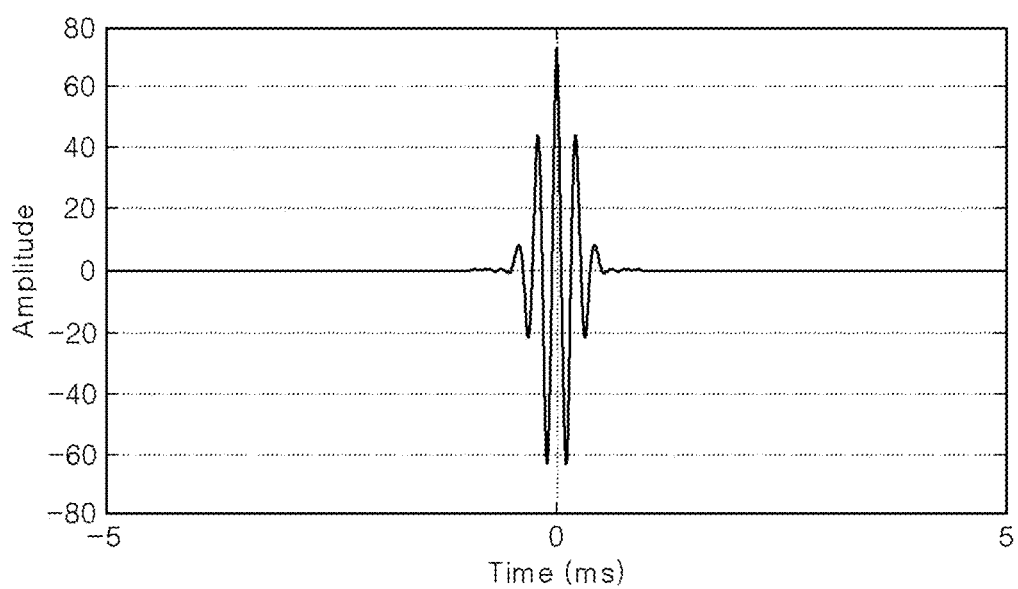
Figure 8:
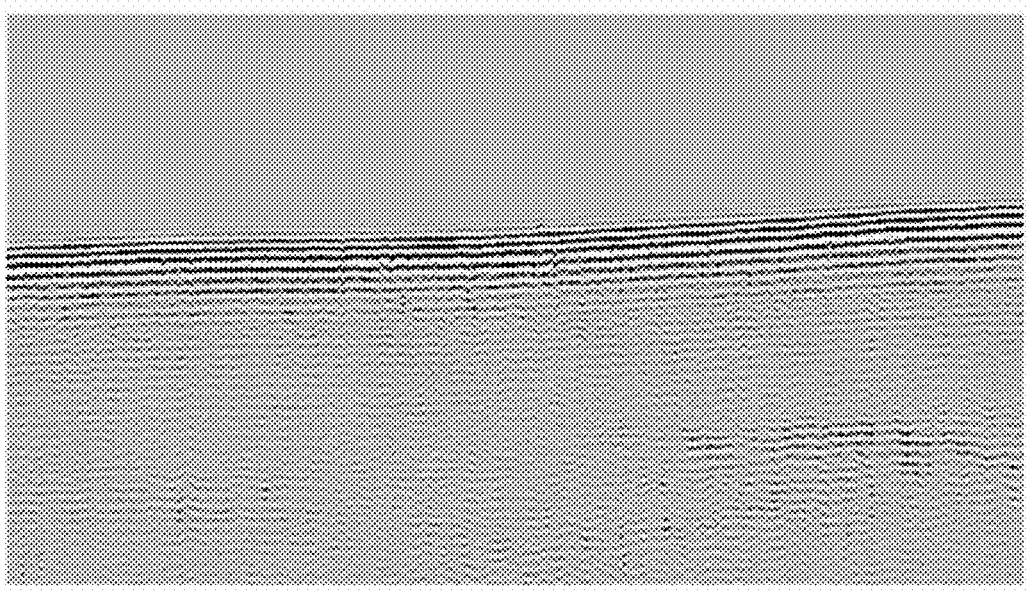

The chirp signal means a chirplet which is increased from a low frequency to a high frequency as shown in FIG. 6 by electronic control. When the chirp signal, i.e., chirplet, is auto-correlated, there is no side lobe as shown in FIG. 7. Therefore, when sub-bottom exploration is performed using the chirp signal, as shown in FIG. 8, there is no ringing, and the reflection amplitude is clearly seen.

However, a chirp sub-bottom profiler using such a chirp signal also uses a modulated signal, and the overall signal belongs to a fairly high frequency signal.

The high frequency signal is more affected by the marine environment than the low frequency signal, so that waveform distortion is severe. Likewise, the chirp signal has a severe waveform distortion. Therefore, a considerable waveform distortion occurs in a process in which the chirp signal transmitted from the oscillator 110 reaches the measurement target and is then reflected to the geophone 120 again.

Conventional chirp sub-bottom profiler uses envelope data, and therefore, the problem of waveform distortion is not so large. However, since all envelope data are treated as positive values, quantitative properties of the sub-bottom may not be grasped.

In other words, to understand the quantitative properties of the sub-bottom using the chirp signal, raw data rather than envelope data should be used.

The problem is that signal processing is very difficult because the chirp signal is a modulated signal that increases from low to high frequency.

Therefore, the present inventor invented a signal processing method capable of grasping a quantitative physical property in spite of using a chirp signal by using a sub-bottom reflection signal of raw data.

In particular, the sub-bottom reflection signal is the strongest signal except the direct wave among the raw data, so that the reliability of the signal processing may be improved by using the sub-bottom reflection signal.

Figure 9:
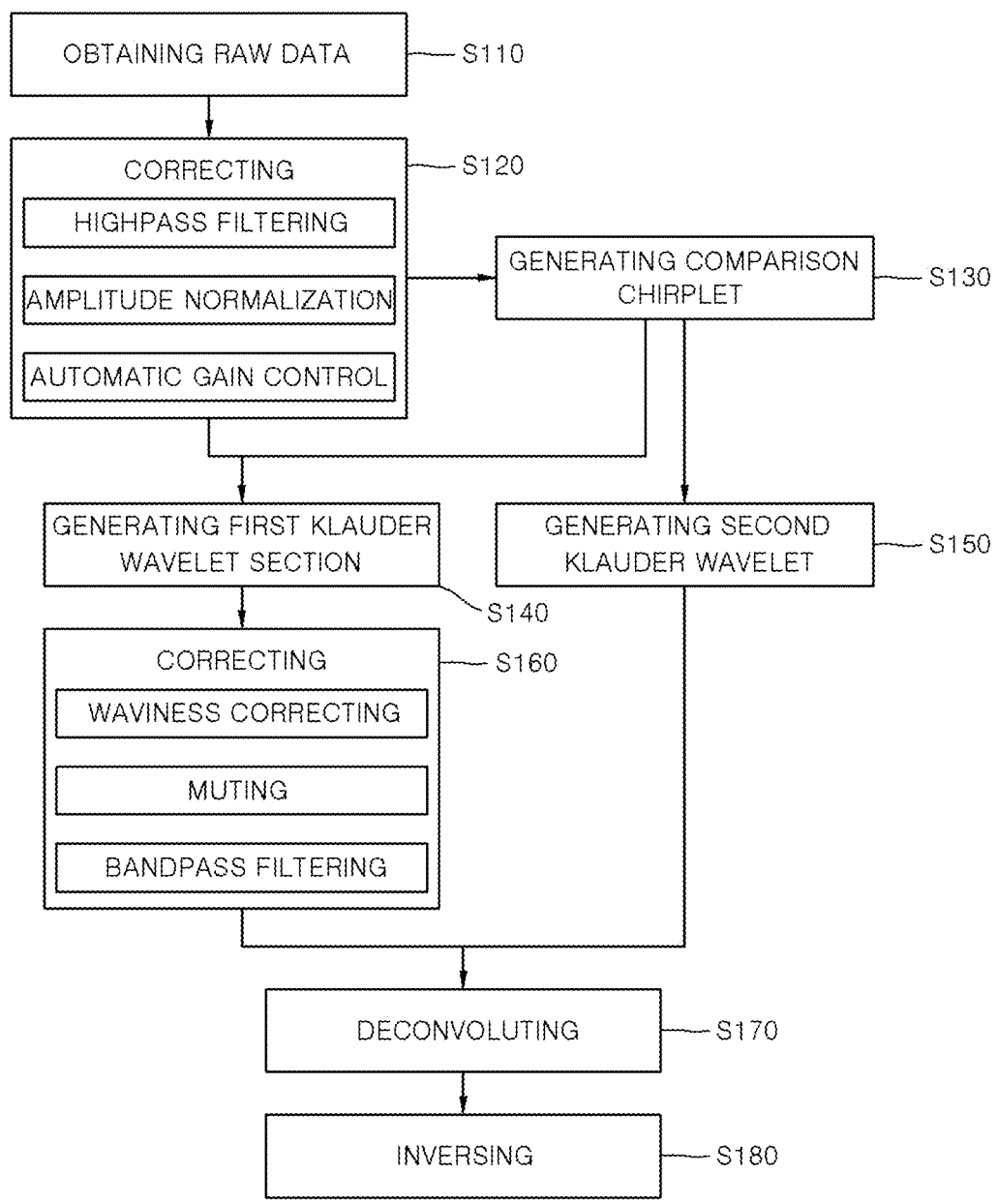
FIG. 9 is a flowchart of a signal processing method of raw data obtained using a chirp sub-bottom profiler according to an embodiment of the present invention.

FIG. 9 is a flowchart of a signal processing method of raw data obtained using a chirp sub-bottom profiler according to an embodiment of the present invention.

Referring to FIG. 9, a method of signal processing of raw data obtained using a chirp sub-bottom profiler includes transmitting a chirplet (minimum frequency: initial first frequency, maximum frequency: initial second frequency, pulse length: initial pulse length) to survey target strata using a chirp sub-bottom profiler and acquiring raw data reflected and received from a target object (S110), correcting the raw data (S120), generating a comparison chirplet (minimum frequency: comparison first frequency, maximum frequency: comparison second frequency, pulse length: comparison pulse length) using a sub-bottom reflection signal of the raw data (S130), cross-correlating the corrected raw data with the comparison chirplet to generate a first Klauder wavelet section (S140), auto-correlating the comparison chirplet to generate a second Klauder wavelet (S150), and deriving a physical property of the survey target strata by deconvoluting the first Klauder wavelet section and the second Klauder wavelet (S150).

Each operation will be described in detail as follows.

First, acquiring raw data (S110) is performed.

Figure 10:
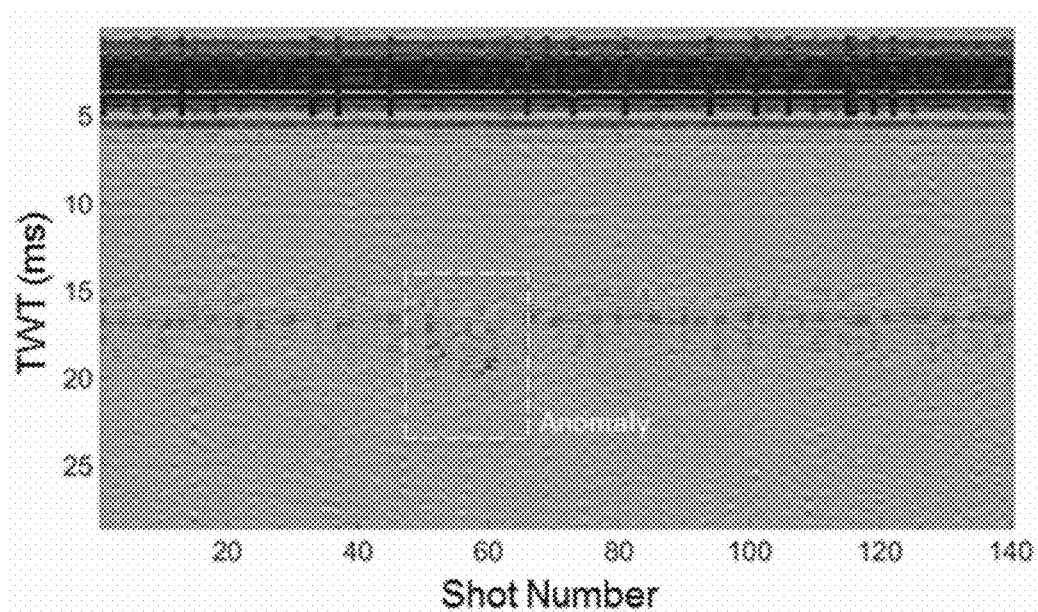
FIG. 10 is a view illustrating raw data obtained by performing a search using chirplet and reflecting the reflected signal according to time and transmission number and illustrating the result of the strata cross section being set again by changing the range of the Y axis.

Acquiring raw data may use the chirp sub-bottom profiler 100 shown in FIGS. 1 and 2. That is, the oscillator 110 transmits the chirplet to the survey target strata, and the chirplet reflected from the target object is received by the geophone 120 to obtain raw data as shown in FIG. 10. In FIG. 10, since the Y axis indicates an elapsed time axis after transmitting the chirp signal, it may be grasped similarly to the depth of the sub-bottom. In addition, since the X-axis of FIG. 10 receives different chirp signals over time, it may be grasped as a horizontal direction rather than a depth direction.

At this time, the transmitted chirplet may have the following conditions.

i) Minimum frequency: 2 kHz (initial first frequency)
ii) Maximum frequency: 7 kHz (initial second frequency)
iii) Pulse length: 5 ms (initial pulse length)

However, the present invention is not limited to the above numerical values, and the condition of the transmitted chirplet may be appropriately modified within a range obvious to a person skilled in the art.

That is, the transmitted chirplet has an initial first frequency as a minimum frequency, an initial second frequency as a maximum frequency, and a pulse length as an initial pulse length. However, the received chirplet has different conditions from the chirplet transmitted by the waveform distortion according to the marine environment. That is, the frequency band and the pulse length are different. Therefore, analyzing the received chirplet with a condition of the transmitted chirplet necessarily includes an error.

On the other hand, it is difficult to confirm whether anomaly exists in the naked eye by using only raw data. As shown in FIG. 10, even if the raw data is resampled (range: 0 to 28.6 ms), it is only possible to assume that an anomaly exists. The anomaly identified in FIG. 10 is the high ship of the Joseon Dynasty buried near the sea of Taean mado, and it is after the trenching work of digging the sub-bottom for archaeological excavation.

Next, correcting the raw data (S120) is performed.

Correcting the raw data S120 may be performed including at least one of Highpass Filtering, Amplitude Normalization, and Automatic Gain Control (AGC). However, when performing several types of correction, the present invention is not limited to the following procedure.

First, Highpass filtering will be described.

Highpass filtering means frequency filtering that passes over only the set frequency band.

When sub-bottom exploration is performed using chirp sub-bottom profiler, an AC noise of 60 Hz or less occurs.

The signal processing method according to an embodiment of the present invention may remove such AC noise through Highpass filtering.

Figure 11:
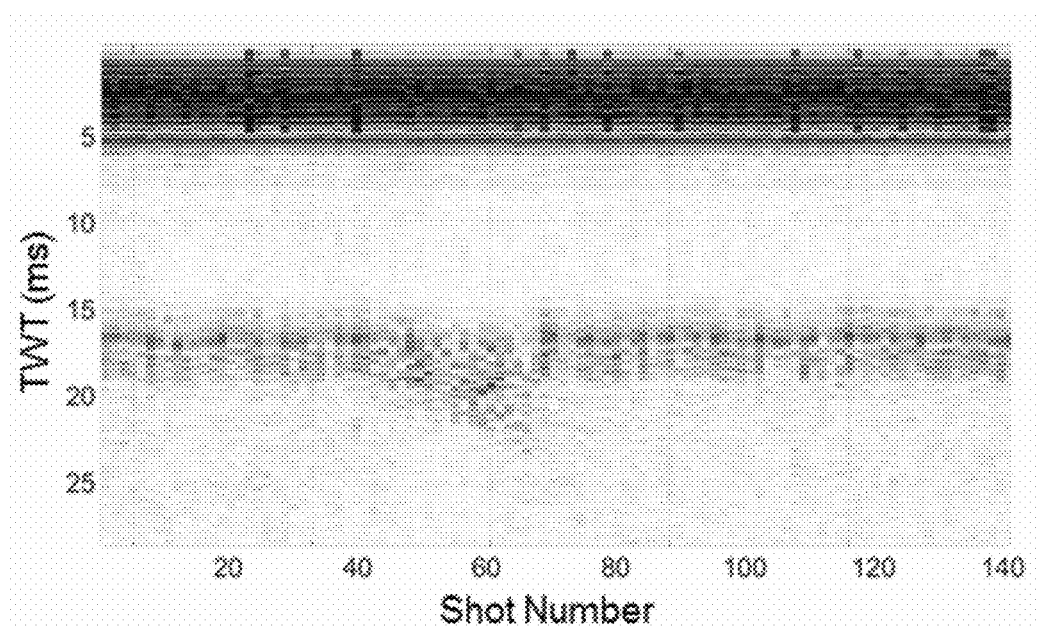
FIG. 11 is a result of removing the AC noise through Highpass filtering the raw data of FIG. 10.

FIG. 11 shows the result of raw data after high-pass filtering is performed. Comparing FIGS. 10 and 11, it may be seen that by performing Highpass filtering, AC noise below 60 Hz may be removed to clearly see different frequency bands.

In addition, amplitude normalization means that the amplitude of the raw data is normalized to −1 to +1.

As described later, the signal processing method according to an embodiment of the present invention artificially generates a comparison chirplet, and performs signal processing using the artifact. At this time, since the comparison chirplet is normalized in amplitude from −1 to +1, in order to use the comparison chirplet, error may be minimized by performing amplitude normalization on the raw data.

Automatic gain control may generally be performed with amplitude normalization to recover the attenuated signal due to spherical divergence, scattering, inherent attenuation, etc., occurring in deep regions.

After performing the correction (S120), generating the comparison chirplet (S130) may be performed.

Generating the comparison chirplet (S130) is performed using the sub-bottom reflection signal. The reason for using the sub-bottom reflection signal is that the amplitude of the sub-bottom reflection signal is strongest except the direct wave and the noise is relatively small.

Generating the comparison chirplet S130 includes a minimum frequency selection operation, a maximum frequency selection operation, and a pulse length selection operation regardless of the order. However, in order to further enhance the reliability of the signal processing, the pulse length selection operation may be performed after selecting the maximum and minimum frequencies.

For the sake of clarity, the method of performing the minimum frequency selection operation first will be described.

Figure 12:
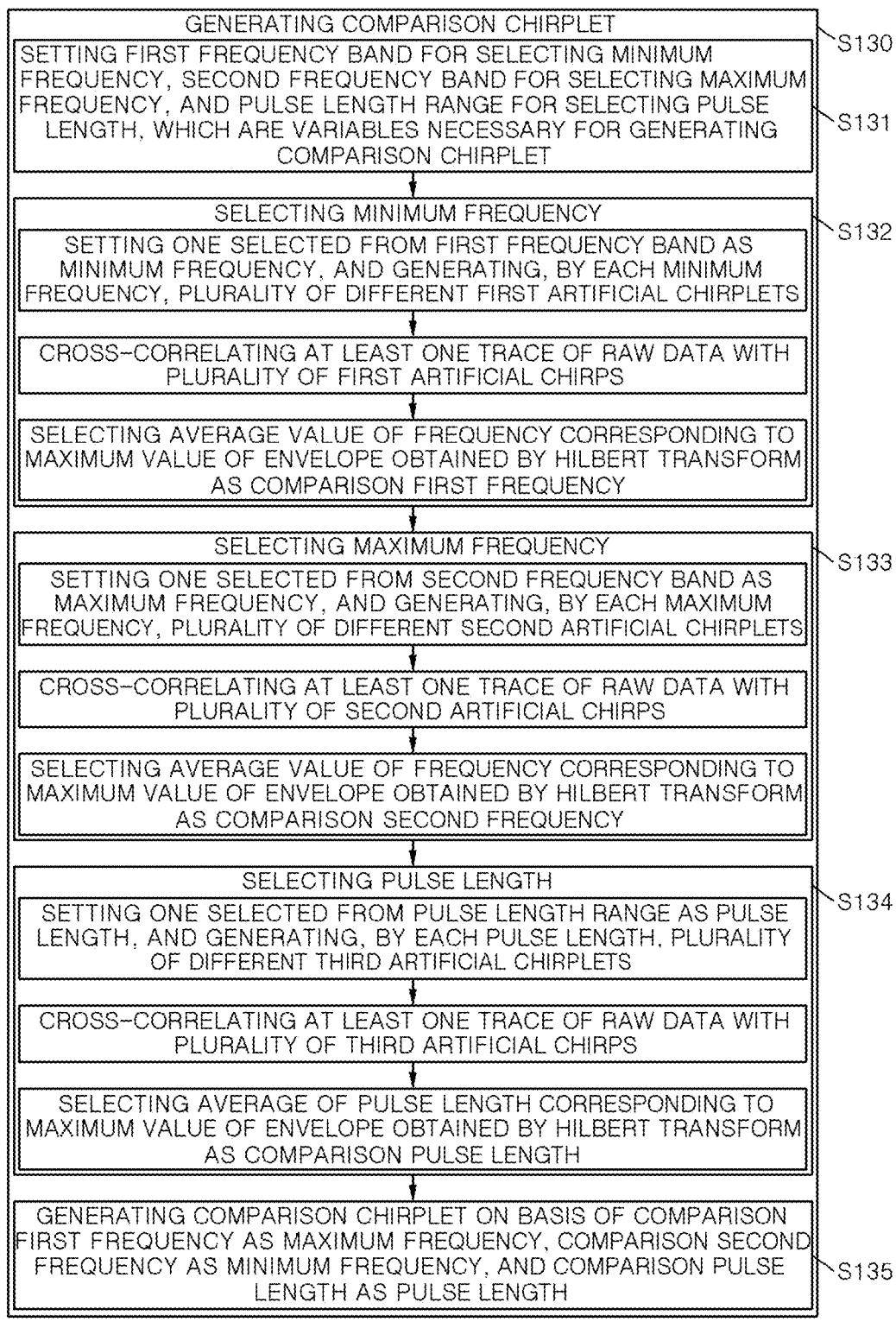
FIG. 12 is a flowchart schematically illustrating a process of obtaining a sound source parameter for generating a comparison chirplet among signal processing methods of raw data obtained using a chirp sub-bottom profiler according to an embodiment of the present invention, and relating to a method of obtaining the minimum frequency first.

FIG. 12 is a flowchart schematically illustrating a process of obtaining a sound source variable for generating a comparison chirplet among signal processing methods of raw data obtained using a chirp sub-bottom profiler according to an embodiment of the present invention, and relating to a method of obtaining the minimum frequency first.

Referring to FIG. 12, generating the comparison chirplet by first obtaining the minimum frequency will be described.

As described above, generating the comparison chirplet is performed using the sub-bottom reflection signal.

First, a first frequency band for selecting a minimum frequency, a second frequency band for selecting a maximum frequency, and a pulse length range for selecting a pulse length, which are variables necessary for generating a comparison chirplet, are set (S131).

The first frequency band, the second frequency band, and the pulse length range used in the signal processing method according to an embodiment of the present invention are as follows but are not limited thereto.

i) First frequency range: 1 to 4000 Hz
ii) Second frequency range: 4000 to 10000 Hz
iii) Pulse length range: 3 to 10 ms The first frequency band, the second frequency band, and the pulse length range are set appropriately in consideration of the initial first frequency (e.g., 2 kHz), the initial second frequency (e.g., 7 kHz), and the pulse length (e.g., 5 ms).

Next, selecting a minimum frequency (S132) is performed. Selecting the minimum frequency (S132) is performed including setting one selected from the first frequency band as a minimum frequency, generating, by each minimum frequency, a plurality of different first artificial chirplets, cross-correlating at least one trace of the raw data with the plurality of first artificial chirps, and selecting an average value of a frequency corresponding to a maximum value of an envelope obtained by the Hilbert transform as a comparison first frequency.

Specifically, it is as follows.

To select the minimum frequency, a first artificial chirplet is generated using a first frequency domain including an initial first frequency.

The conditions of the first artificial chirplet are as follows.

i) Minimum frequency: one selected from 1 to 4000 Hz (the first frequency range)

ii) Maximum frequency: 7 kHz (initial second frequency)

iii) Pulse length: 5 ms (initial pulse length)

That is, a plurality of first artificial chirplets using one selected from the first frequency domain as a minimum frequency are generated. For example, if the minimum frequency is selected in units of 1 Hz, 4000 first artificial chirplets are generated.

A Klauder wavelet section is generated by cross-correlation with a plurality of first artificial chirplets and one trace of the raw data. The trace used here and the trace used for maximum frequency selection and pulse length selection may be a trace having no anomaly. That is, the reliability of the signal processing method may be further improved by using a trace having no anomaly.

Figure 13:
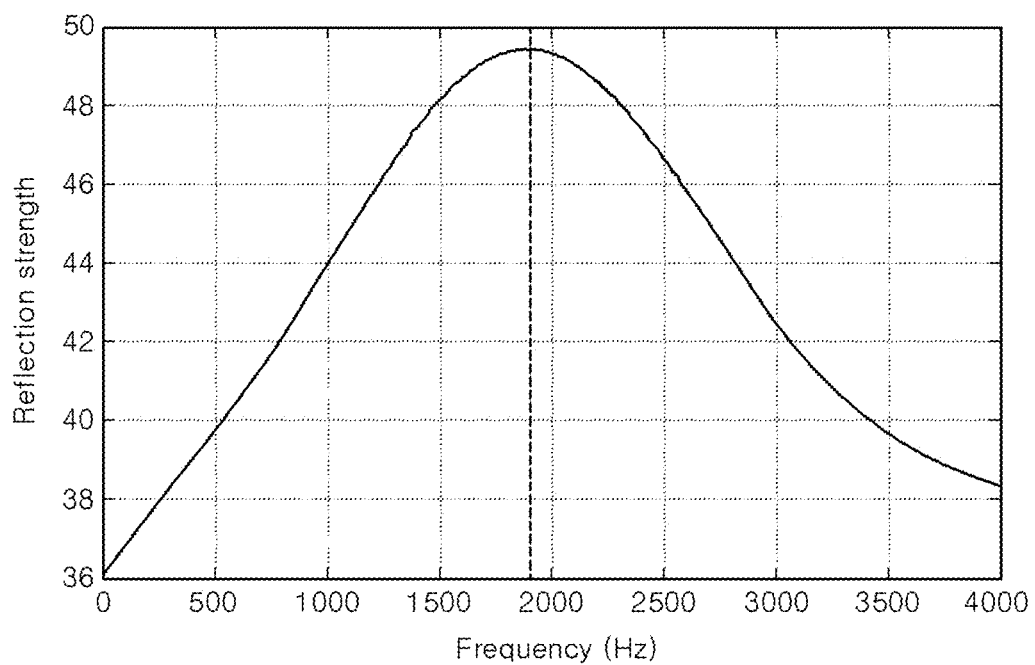
FIG. 13 illustrates a process of selecting a minimum frequency for one trace in the process of selecting a minimum frequency, which is one of conditions for generating the comparison chirplet described in FIG. 12.

When the Hilbert transform is performed on the Klauder wavelet section obtained by cross-correlation of the first artificial chirplet and the trace, the envelope data as shown in FIG. 13 is obtained. If the plurality of first artificial chirplets and one trace of the raw data are cross-correlated, as the coherence is higher, the value of the envelope data is higher. That is, the frequency corresponding to the maximum value of the envelope is the frequency having the highest coherence.

Figure 14:
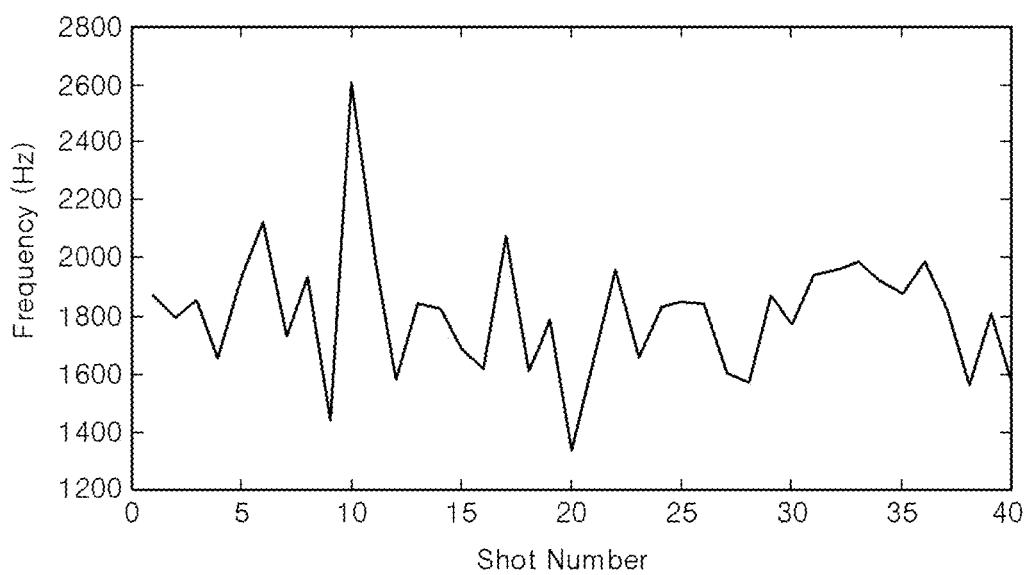
FIG. 14 is a view for explaining a process of calculating the average value after performing the minimum frequency selection process of FIG. 13 on other traces.

If necessary, for each of the other traces, a Klauder wavelet section is obtained by cross-correlation with the first artificial chirplet as described above, and the obtained Klauder wavelet section is Hilbert transformed to obtain the frequency corresponding to the maximum value of the envelope as shown in FIG. 14. The average value of the frequencies obtained by the above process is selected as a comparison first frequency which indicates the minimum frequency of the generation conditions of the comparison chirplet. Here, the comparison first frequency was 1811 Hz.

After selecting the comparison first frequency as the minimum frequency, selecting the maximum frequency (S133) is performed. Selecting the maximum frequency (S133) is performed including setting one selected from the second frequency band as a maximum frequency, generating, by each maximum frequency, a plurality of different second artificial chirplets, cross-correlating at least one trace of the raw data with the plurality of second artificial chirps, and selecting an average value of a frequency corresponding to a maximum value of an envelope obtained by the Hilbert transform as a comparison second frequency.

Specifically, it is as follows.

To select the maximum frequency, a second artificial chirplet is generated using a second frequency domain including an initial second frequency.

The conditions of the second artificial chirplet are as follows.

i) Minimum frequency: 1811 Hz (comparison first frequency)

ii) Maximum frequency: Any one selected from 4000 to 10000 Hz (second frequency domain)

iii) Pulse length: 5 ms (initial pulse length)

That is, a plurality of second artificial chirplets using one selected from the second frequency domain as a maximum frequency are generated. For example, if the maximum frequency is selected in units of 1 Hz, 6000 second artificial chirplets are generated.

On the other hand, if the comparison first frequency is used as the minimum frequency, the reliability of the data may be further improved.

A Klauder wavelet section is generated by cross-correlation with a plurality of second artificial chirplets and one trace of the raw data.

Figure 15:
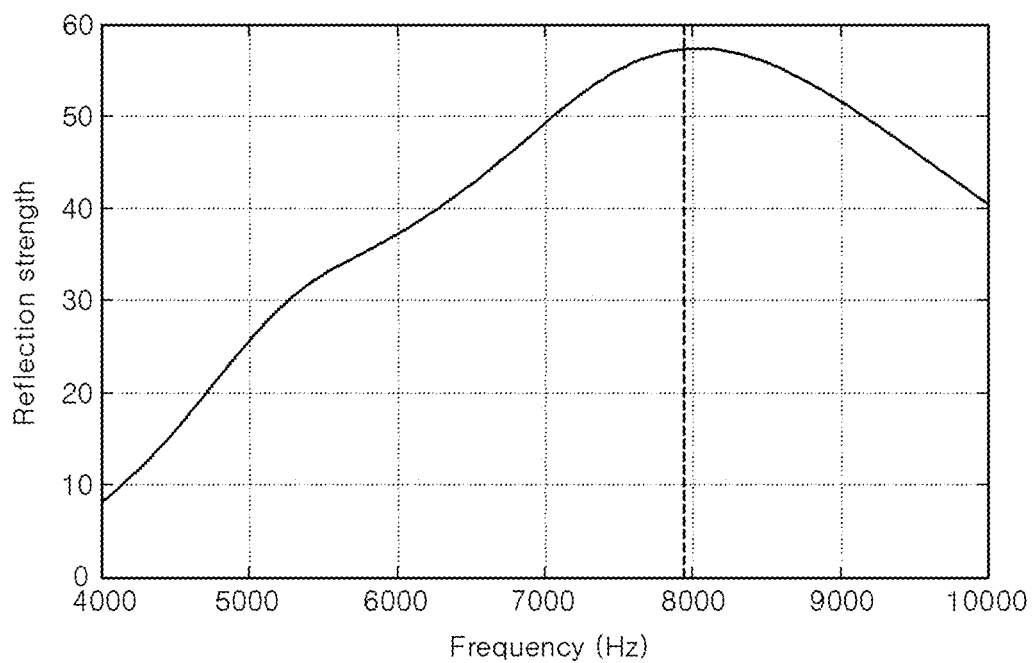
FIG. 15 illustrates a process of selecting a maximum frequency for one trace in the process of selecting a maximum frequency, which is one of conditions for generating the comparison chirplet described in FIG. 12.

When the Hilbert transform is performed on the Klauder wavelet section obtained by cross-correlation of the plurality of second artificial chirplets and the trace, the envelope data as shown in FIG. 15 is obtained. If the plurality of second artificial chirplets and one trace of the raw data are cross-correlated, as the coherence is higher, the value of the envelope data is higher. That is, the frequency corresponding to the maximum value of the envelope is the frequency having the highest coherence.

Figure 16:
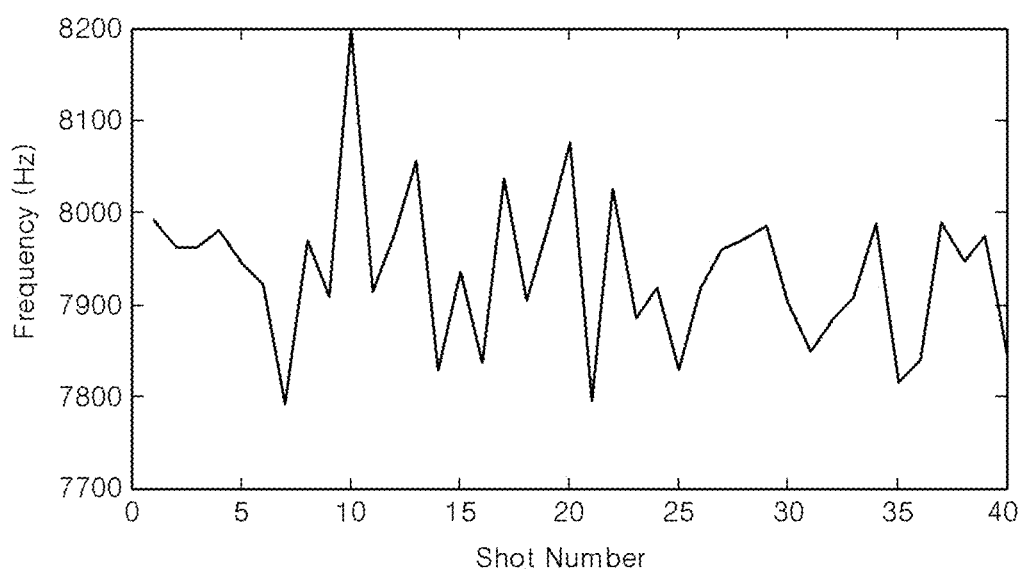
FIG. 16 is a view for explaining a process of calculating the average value after performing the maximum frequency selection process of FIG. 15 on other traces.

If necessary, for each of the other traces, a Klauder wavelet section is obtained by cross-correlation with the second artificial chirplet as described above, and the obtained Klauder wavelet section is Hilbert transformed to obtain the frequency corresponding to the maximum value of the envelope as shown in FIG. 16. The average value of the frequencies obtained by the above process is selected as a comparison second frequency which indicates the maximum frequency of the generation conditions of the comparison chirplet. Here, the comparison second frequency was 7935 Hz.

After selecting the comparison second frequency as the maximum frequency, selecting the pulse length (S134) is performed. Selecting the pulse length (S134) is performed including setting one selected from the pulse length range as a pulse length, generating, by each pulse length, a plurality of different third artificial chirplets, cross-correlating at least one trace of the raw data with the plurality of third artificial chirps, and selecting an average of a pulse length corresponding to a maximum value of an envelope obtained by the Hilbert transform as a comparison pulse length.

Specifically, it is as follows.

To select the pulse length, a third artificial chirplet is generated using the pulse length range including the initial pulse length.

The conditions of the third artificial chirplet are as follows.

i) Minimum frequency: 1873 Hz (comparison first frequency)

ii) Maximum frequency: 7935 Hz (comparison second frequency)

iii) Pulse length: Any one selected from 3 to 10 ms (pulse length range)

That is, a plurality of third artificial chirplets having one selected from the pulse length range as the pulse length are generated. For example, if the pulse length is selected in units of 0.01 ms, 700 third artificial chirplets are generated.

On the other hand, the reliability of the data may be further improved by using the comparison first frequency as the minimum frequency and the comparison second frequency as the maximum frequency.

A Klauder wavelet section is generated by cross-correlation with a plurality of third artificial chirplets and one trace of the raw data.

Figure 17:
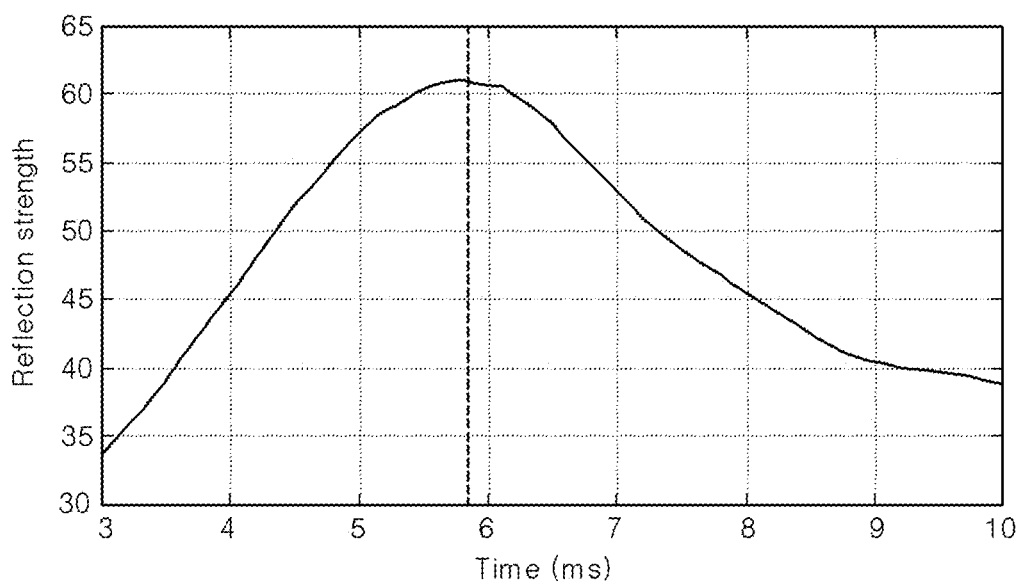
FIG. 17 illustrates a process of selecting a pulse length for one trace in the process of selecting a pulse length, which is one of conditions for generating the comparison chirplet described in FIG. 12.

When the Hilbert transform is performed on the Klauder wavelet section obtained by cross-correlation of the plurality of third artificial chirplets and the trace, the envelope data as shown in FIG. 17 is obtained. If the plurality of third artificial chirplets and one trace of the raw data are cross-correlated, as the coherence is higher, the value of the envelope data is higher. That is, the pulse length corresponding to the maximum value of the envelope is the pulse length having the highest coherence.

Figure 18:
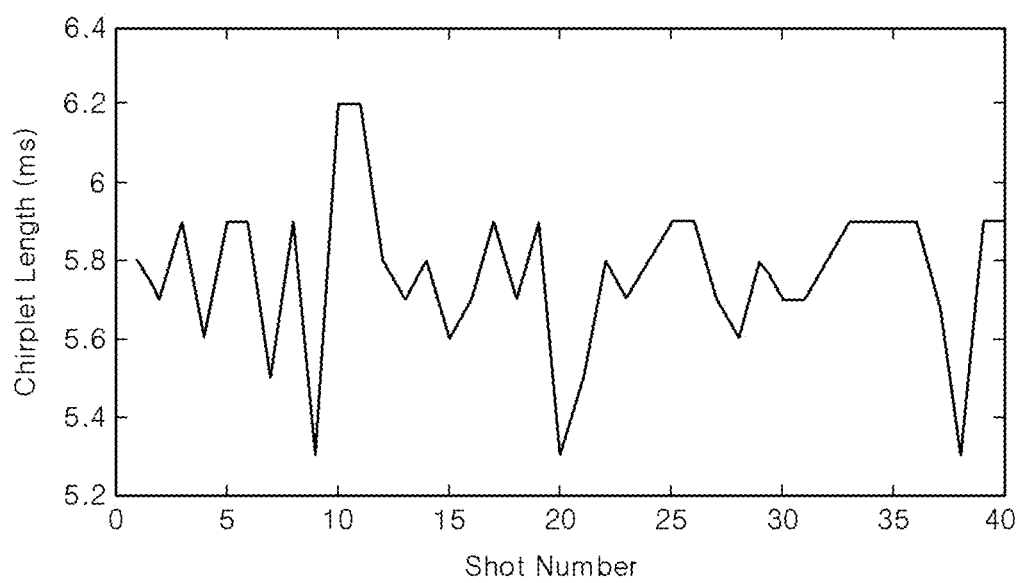
FIG. 18 is a view for explaining a process of calculating the average value after performing the pulse length selection process of FIG. 17 on other traces.

If necessary, for each of the other traces, a Klauder wavelet section is obtained by cross-correlation with the third artificial chirplet as described above, and the obtained Klauder wavelet section is Hilbert transformed to obtain the pulse length corresponding to the maximum value of the envelope as shown in FIG. 18. The average value of the pulse lengths obtained by the above process is selected as the comparison pulse length which indicates the pulse length in the generation condition of the comparison chirplet. Here, the comparison pulse length was 5.8 ms.

Figure 19:
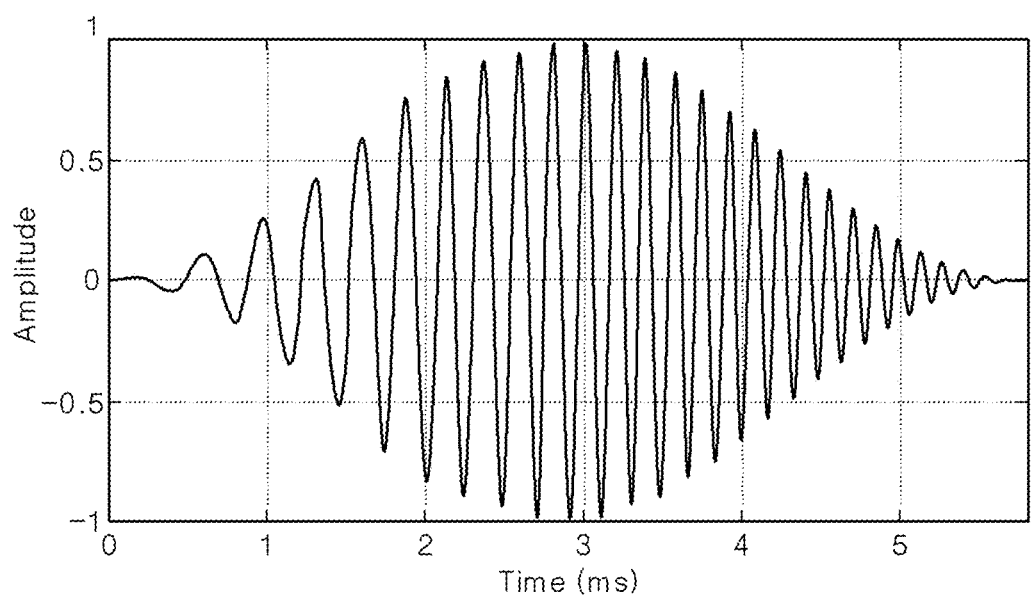
FIG. 19 shows a comparison chirplet generated using the minimum frequency, maximum frequency, and pulse length selected through the process of FIG. 12.

Generating a comparison chirplet (S135) on the basis of the minimum frequency, the maximum frequency, and the pulse length obtained by the above method is performed and is shown in FIG. 19. The conditions of the comparison chirplet are as follows.

i) Minimum frequency: 1811 Hz (comparison first frequency)

ii) Maximum frequency: 7935 Hz (comparison second frequency)

iii) Pulse length: 5.8 ms (comparison pulse length)

Comparing comparison chirplet variables and initial variables, it may be seen that both the minimum frequency, the maximum frequency and the pulse length are considerably changed. Particularly, in the case of the pulse length, as the pulse length becomes longer according to the signal propagation, it may be seen that the comparison chirplet reflects the signal distortion due to the signal propagation.

On the other hand, unlike FIG. 12, the maximum frequency may be selected first to generate a comparison chirplet.

Figure 20:
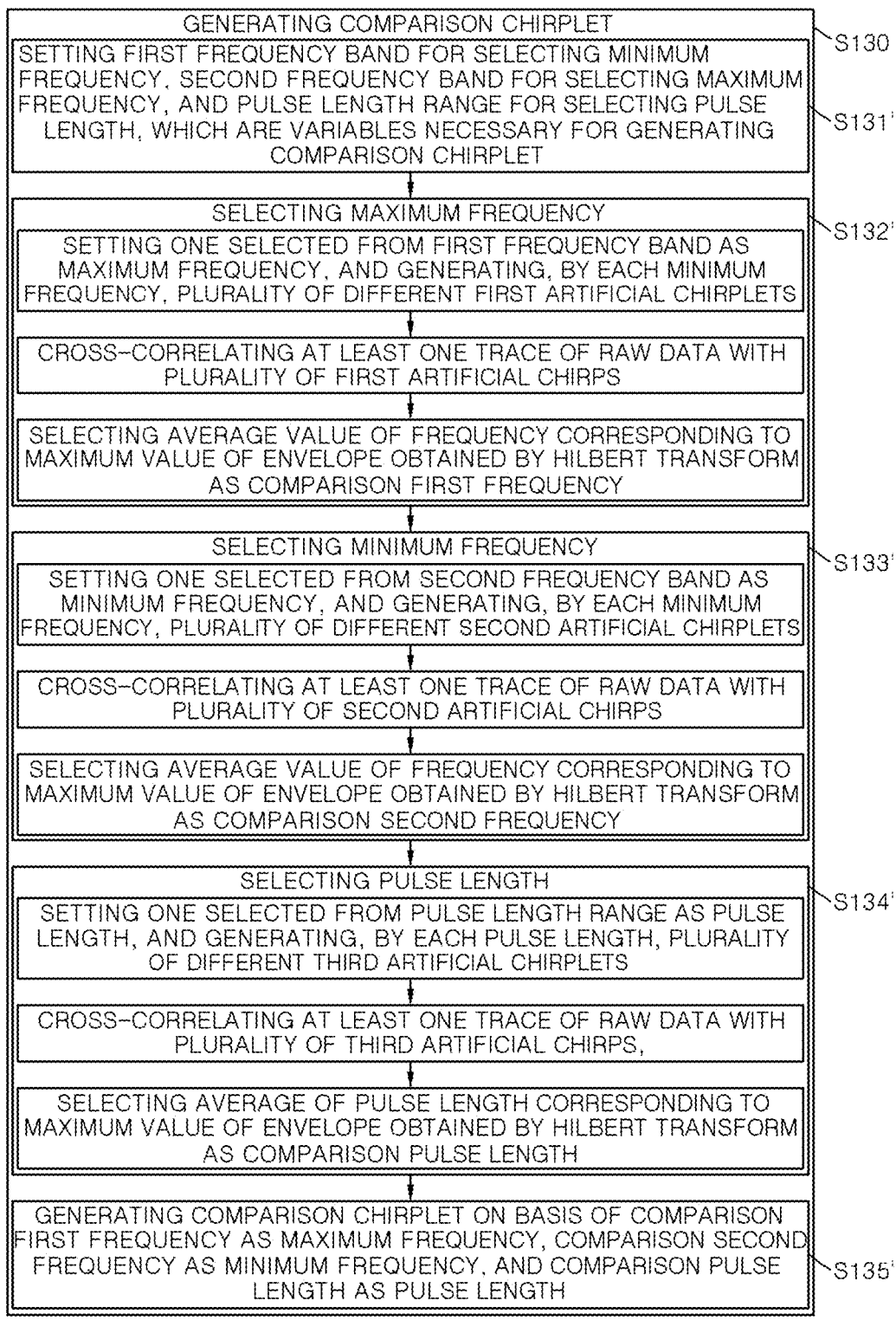
FIG. 20 is a flowchart schematically illustrating a process of obtaining a sound source parameter for generating a comparison chirplet among signal processing methods of raw data obtained using a chirp sub-bottom profiler according to an embodiment of the present invention, and relating to a method of obtaining the maximum frequency first.

FIG. 20 is a flowchart schematically illustrating a process of obtaining a sound source variable for generating a comparison chirplet among signal processing methods of raw data obtained using a chirp sub-bottom profiler according to an embodiment of the present invention, and relating to a method of obtaining the maximum frequency first.

As described above, generating the comparison chirplet is performed using the sub-bottom reflection signal.

First, a first frequency band for selecting a minimum frequency, a second frequency band for selecting a maximum frequency, and a pulse length range for selecting a pulse length, which are variables necessary for generating a comparison chirplet, are set (S131').

The first frequency band, the second frequency band, and the pulse length range used in the signal processing method according to an embodiment of the present invention are as follows but are not limited thereto.

i) First frequency range: 4000 to 10000 Hz ii) Second frequency range: 1 to 4000 Hz iii) Pulse length range: 3 to 10 ms The first frequency band, the second frequency band, and the pulse length range are set appropriately in consideration of the initial second frequency (e.g., 7 kHz), the initial first frequency (e.g., 2 kHz), and the pulse length (e.g., 5 ms).

Next, selecting a maximum frequency (S132') is performed. Selecting the maximum frequency (S132') is performed including setting one selected from the first frequency band as a maximum frequency, generating, by each minimum frequency, a plurality of different first artificial chirplets, cross-correlating at least one trace of the raw data with the plurality of first artificial chirps, and selecting an average value of a frequency corresponding to a maximum value of an envelope obtained by the Hilbert transform as a comparison first frequency.

Specifically, it is as follows.

To select the maximum frequency, a first artificial chirplet is generated using a first frequency domain including an initial second frequency.

The conditions of the first artificial chirplet are as follows.

i) Maximum frequency: one selected from 4000 to 10000 Hz (the first frequency domain)

ii) Minimum frequency: 2 kHz (initial first frequency)

iii) Pulse length: 5 ms (initial pulse length)

That is, a plurality of first artificial chirplets using one selected from the first frequency domain as a maximum frequency are generated. For example, if the maximum frequency is selected in units of 1 Hz, 6000 first artificial chirplets are generated.

A Klauder wavelet section is generated by cross-correlation with a plurality of first artificial chirplets and one trace of the raw data.

When the Hilbert transform is performed on the Klauder wavelet section obtained by cross-correlation of the first artificial chirplet and the trace, the envelope data is obtained. If the plurality of first artificial chirplets and one trace of the raw data are cross-correlated, as the coherence is higher, the value of the envelope data is higher. That is, the frequency corresponding to the maximum value of the envelope is the frequency having the highest coherence.

If necessary, for each of the other traces, a Klauder wavelet section is obtained by cross-correlation with the first artificial chirplet as described above, and the obtained Klauder wavelet section is Hilbert transformed to obtain the frequency corresponding to the maximum value of the envelope. The average value of the frequencies obtained by the above process is selected as a comparison first frequency which indicates the maximum frequency of the generation conditions of the comparison chirplet.

After selecting the comparison first frequency as the maximum frequency, selecting the minimum frequency (S133') is performed. Selecting the minimum frequency (S133') is performed including setting one selected from the second frequency band as a minimum frequency, generating, by each minimum frequency, a plurality of different second artificial chirplets, cross-correlating at least one trace of the raw data with the plurality of second artificial chirps, and selecting an average value of a frequency corresponding to a maximum value of an envelope obtained by the Hilbert transform as a comparison second frequency.

Specifically, it is as follows.

To select the minimum frequency, a second artificial chirplet is generated using a second frequency domain including an initial first frequency.

The conditions of the second artificial chirplet are as follows.

i) Maximum frequency: comparison first frequency
ii) Minimum frequency: any one selected from 1 to 4000 Hz (second frequency range)
iii) Pulse length: 5 ms (initial pulse length)

That is, a plurality of second artificial chirplets using one selected from the second frequency domain as a minimum frequency are generated. For example, if the minimum frequency is selected in units of 1 Hz, 4000 second artificial chirps are generated.

On the other hand, if the comparison first frequency is used as the maximum frequency, the reliability of the data may be further improved.

A Klauder wavelet section is generated by cross-correlation with a plurality of second artificial chirplets and one trace of the raw data.

When the Hilbert transform is performed on the Klauder wavelet section obtained by cross-correlation of the plurality of second artificial chirplets and the trace, the envelope data is obtained. If the plurality of second artificial chirplets and one trace of the raw data are cross-correlated, as the coherence is higher, the value of the envelope data is higher. That is, the frequency corresponding to the maximum value of the envelope is the frequency having the highest coherence.

If necessary, for each of the other traces, a Klauder wavelet section is obtained by cross-correlation with the second artificial chirplet as described above, and the obtained Klauder wavelet section is Hilbert transformed to obtain the frequency corresponding to the maximum value of the envelope. The average value of the frequencies obtained by the above process is selected as a comparison second frequency which indicates the minimum frequency of the generation conditions of the comparison chirplet.

After selecting the comparison second frequency as the minimum frequency, selecting the pulse length (S134') is performed. Selecting the pulse length (S134') is performed including setting one selected from the pulse length range as a pulse length, generating, by each pulse length, a plurality of different third artificial chirplets, cross-correlating at least one trace of the raw data with the plurality of third artificial chirps, and selecting an average of a pulse length corresponding to a maximum value of an envelope obtained by the Hilbert transform as a comparison pulse length.

Specifically, it is as follows.

To select the pulse length, a third artificial chirplet is generated using the pulse length range including the initial pulse length.

The conditions of the third artificial chirplet are as follows.

i) Maximum frequency: comparison first frequency
ii) Minimum frequency: comparison second frequency
iii) Pulse length: any one selected from 3 to 10 ms (pulse length range)

That is, a plurality of third artificial chirplets having one selected from the pulse length range as the pulse length are generated. For example, if the pulse length is selected in units of 0.01 ms, 700 third artificial chirplets are generated.

On the other hand, the reliability of the data may be further improved by using the comparison first frequency as the maximum frequency and the comparison second frequency as the minimum frequency.

A Klauder wavelet section is generated by cross-correlation with a plurality of third artificial chirplets and one trace of the raw data.

When the Hilbert transform is performed on the Klauder wavelet section obtained by cross-correlation of the plurality of third artificial chirplets and the trace, the envelope data is obtained. If the plurality of third artificial chirplets and one trace of the raw data are cross-correlated, as the coherence is higher, the value of the envelope data is higher. That is, the pulse length corresponding to the maximum value of the envelope is the pulse length having the highest coherence.

If necessary, for each of the other traces, a Klauder wavelet section is obtained by cross-correlation with the third artificial chirplet as described above, and the obtained Klauder wavelet section is Hilbert transformed to obtain the pulse length corresponding to the maximum value of the envelope. The average value of the pulse lengths obtained by the above process is selected as the comparison pulse length which indicates the pulse length in the generation condition of the comparison chirplet.

Generating a comparison chirplet (S135') on the basis of the maximum frequency, the minimum frequency, and the pulse length obtained by the above method may be performed.

Then, by cross-correlating the generated comparison chirplet and the raw data, generating a first Klauder wavelet section (S140) is performed.

Figure 21A:
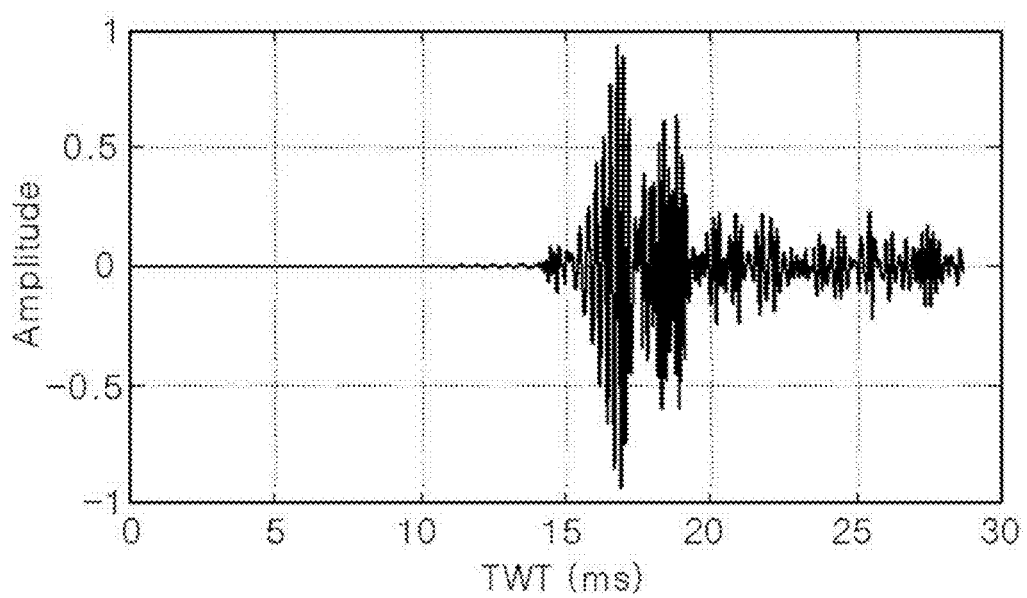
FIGS. 21A, 21B, and 21C shows a process of obtaining a first Klauder wavelet section by cross-correlating a comparison chirplet with raw data.
Figure 21B:
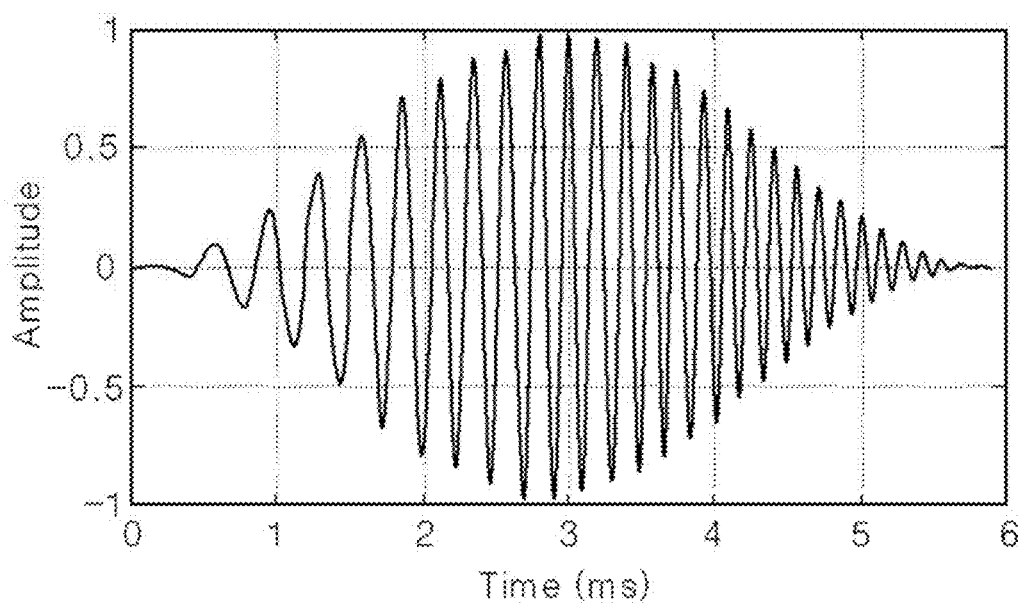
Figure 21C:
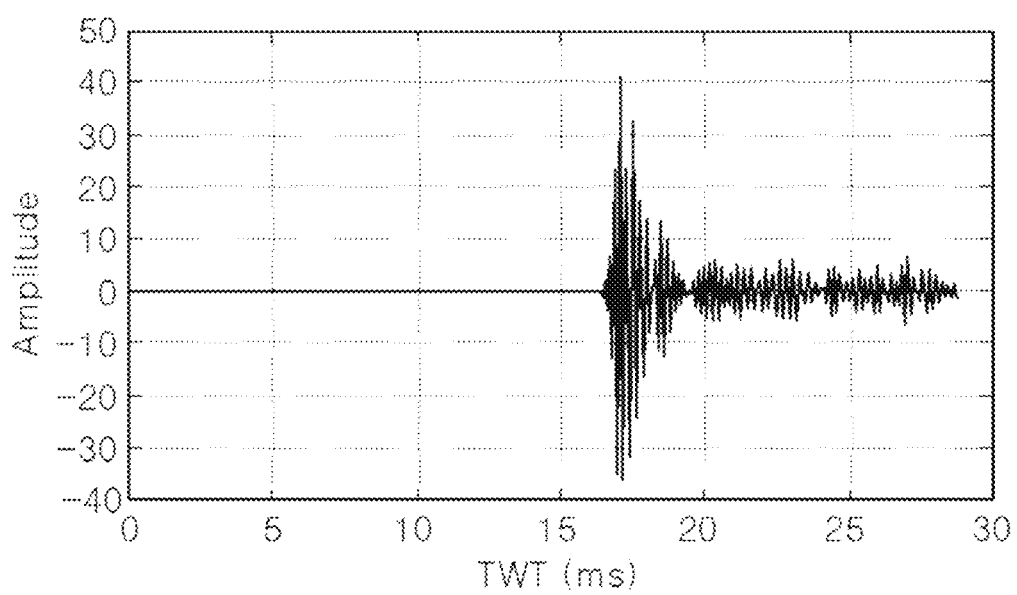

Referring to FIGS. 21A, 21B, and 21C, generating the first Klauder wavelet section (S140) is performed by cross-correlating the comparison chirplet with each of the traces constituting the raw data (corrected raw data when corrected).

That is, as shown in FIGS. 21A, 21B, and 21C, the first Klauder wavelet section (FIG. 21C) may be obtained by cross-correlating the trace of the raw data (FIG. 21A) with the comparison chirplet (FIG. 21B).

If the initial variable of chirplet used in the exploration is used without using the comparison chirplet, signal distortion is significantly reduced in the signal processing process.

In other words, in relation to the raw data, signal distortion (change in frequency and pulse length) due to submarine environment, attenuation, noise, and the like by the path through which the signal generated from the oscillator reaches the exploration target and then returns to the geophone may not be avoided.

Therefore, if the signal processing of raw data is performed based on initial variables, since it does not reflect the signal distortion, the reliability of signal processing is significantly reduced.

But, a signal processing method of raw data obtained using a chirp sub-bottom profiler according to an embodiment of the present invention performs signal processing by using the comparison chirplet that reflects the signal distortion, so that the reliability of the signal processing may be remarkably improved.

Figure 22:
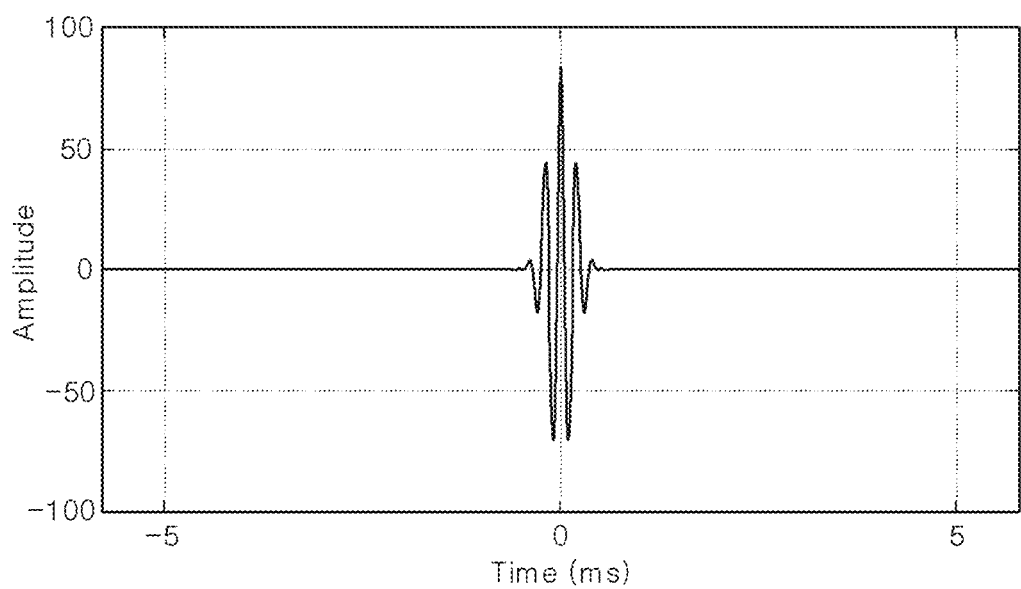
FIG. 22 shows a process of auto-correlating a comparison chirplet to obtain a second crawler wavelet.

On the other hand, apart from generating the first Klauder wavelet section, by auto-correlating the comparison chirplet, as shown in FIG. 22, generating a second Klauder wavelet (S150) is performed.

The second Klauder wavelet is used when performing deconvolution described later with the first Klauder wavelet section and has a zero phase.

The first Klauder wavelet section may further perform correcting (S160) once more before deconvolution with the first Klauder wavelet.

Correcting (S160) may include at least one of correcting the influence of waviness, muting, and band pass filtering. Correcting (S160) is not limited to the order of description unless otherwise specified below.

First, correcting the influence of waviness may be performed.

As shown in FIG. 1, since the sub-bottom exploration is carried out by installing a chirp sub-bottom profiler on the ship, the movement of the ship by the waviness must be included in the raw data. Therefore, in order to improve the reliability of exploration results, it is necessary to consider the influence of waviness.

Figure 23:
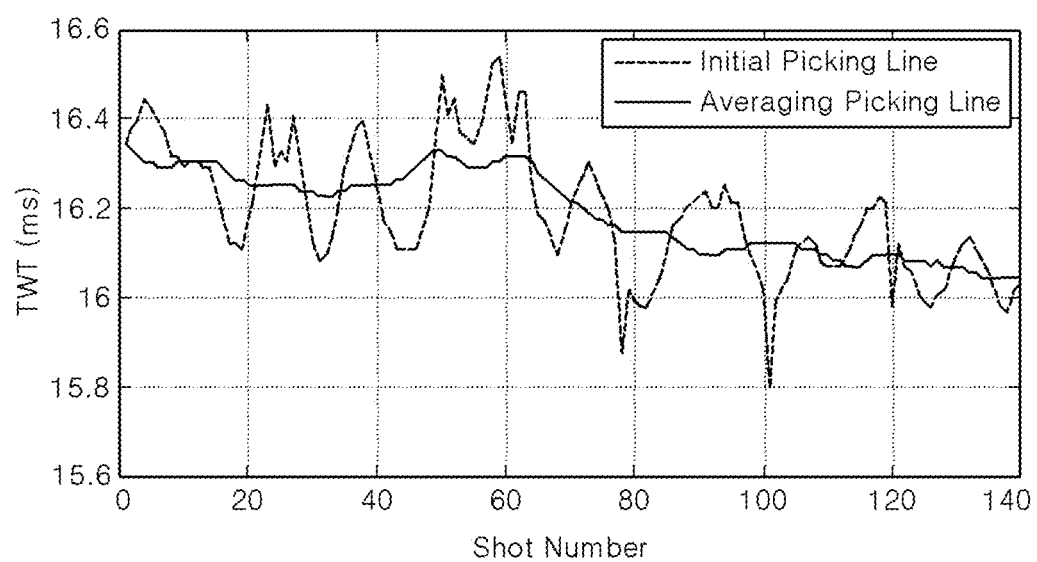
FIG. 23 schematically shows a process of auto-picking a first Klauder wavelet section.

To correct the influence of waviness, an arbitrary trace without anomaly is extracted and the extracted trace is cross-correlated with other traces, so that an initial peaking line is generated as shown in FIG. 23.

Next, the initial peaking line is moving-averaged to generate a latter peaking line as shown in FIG. 23.

Finally, waviness correction is performed using the difference of the initial peaking line based on the latter peaking line. That is, by comparing the initial peaking line with the latter peaking line, it is possible to correct the effect of waviness by moving the peaking line based on the latter peaking line.

On the other hand, after correcting the influence of the waviness, muting is performed.

Muting improves the signal to noise ratio (S/N ratio) by removing the direct wave that replaces the top end of the peaking line with a value of 0 by using the latter peaking line and noise.

Since muting is to remove all of the top ends of the sub-bottom reflection zone, the signal processing order is affected.

And then, band pass filtering is performed.

Bandpass filtering is to pass a specific frequency. The comparison first frequency (minimum frequency of the comparison chirplet) is f1, the initial first frequency is f2, the initial second frequency is f3, and the comparison second frequency (the maximum frequency of the comparison chirplet) is f4. An operation is made by blocking a signal of a frequency band of f1 or less and f4 or more and passing a signal of a frequency band between f2 and f3.

Figure 24:
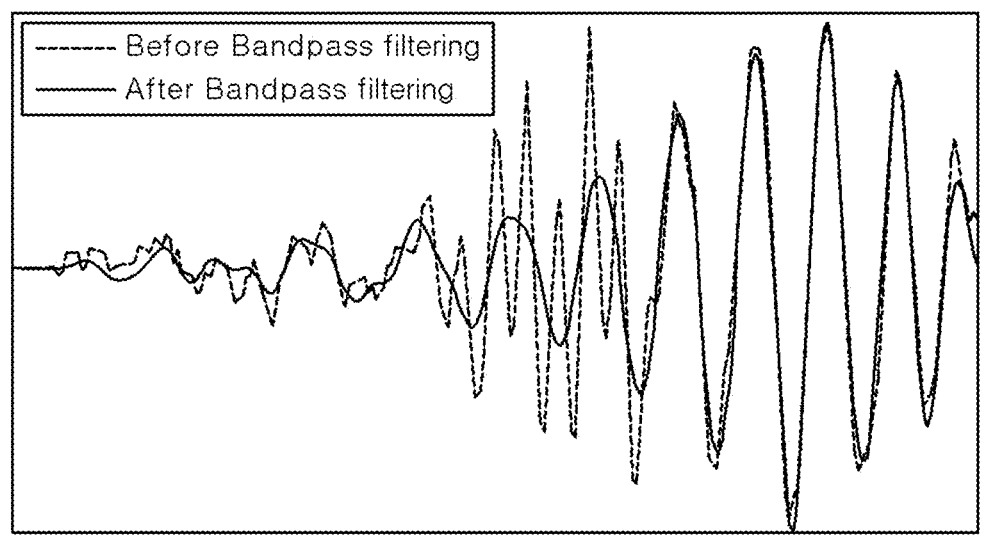
FIG. 24 compares the forms of signals before and after Bandpass filtering.

That is, band-pass filtering refers recovering the cut traces to match a frequency band through a band filter after muting. Referring to FIG. 24, it may be seen that after performing band pass filtering, each trace has a chirplet shape.

Figure 25:
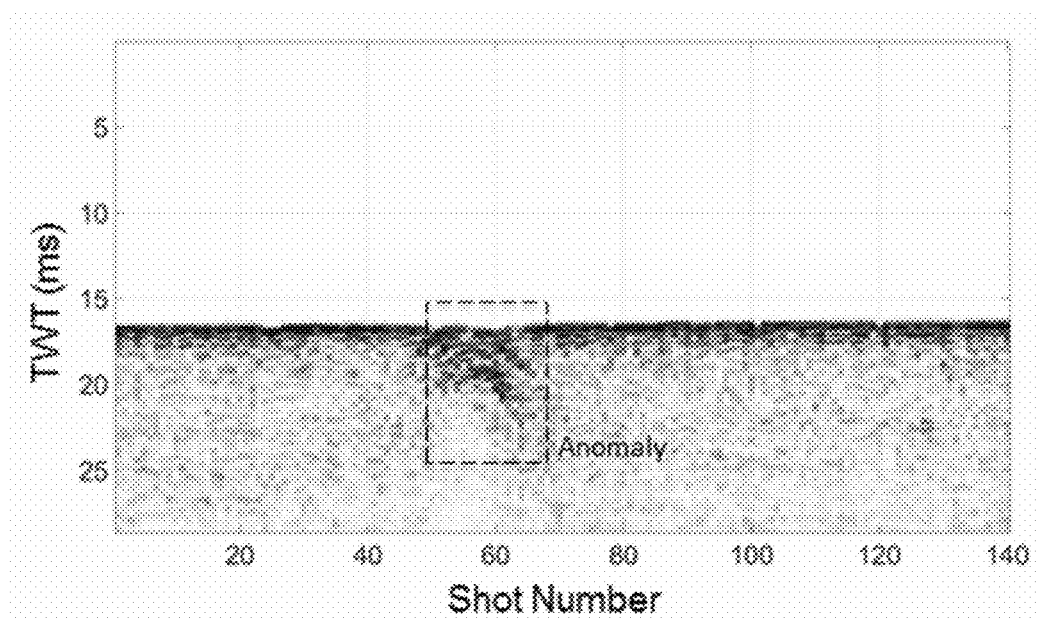
FIG. 25 schematically shows a result of muting for correcting the influence due to waviness and Bandpass filtering.
Figure 26:
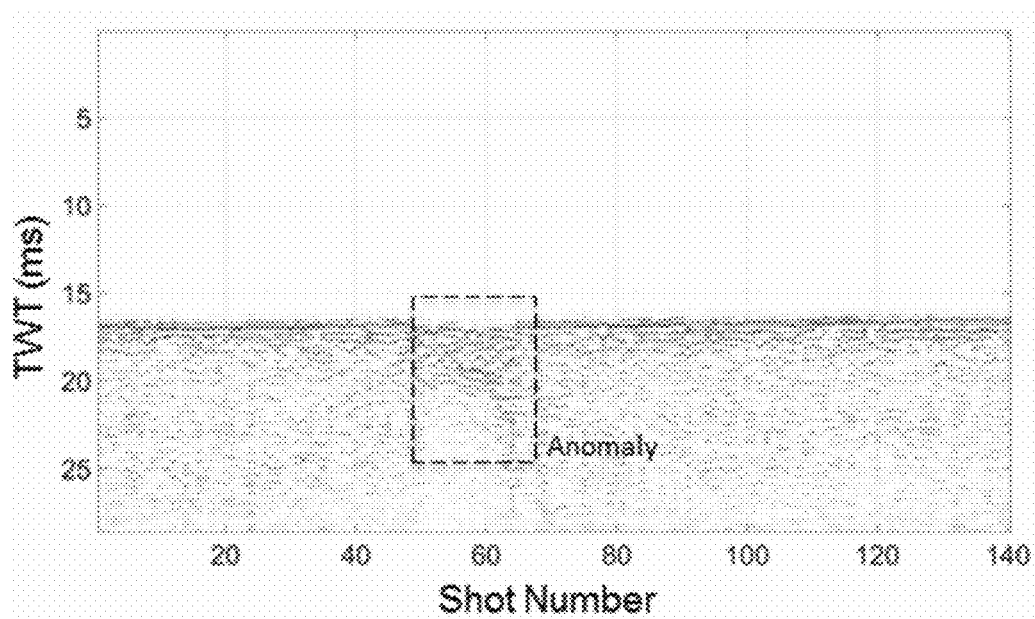
FIGS. 26 to 29 show the results of the process of deconvoluting the first Klauder wavelet section and the second Klauder wavelet with each other.
Figure 27:
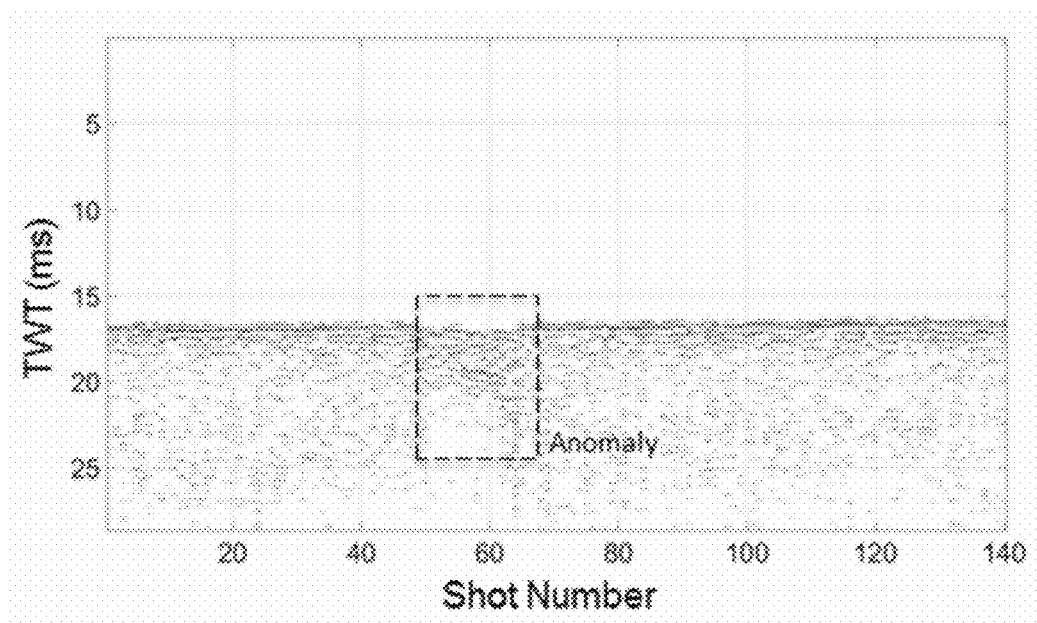
Figure 28:
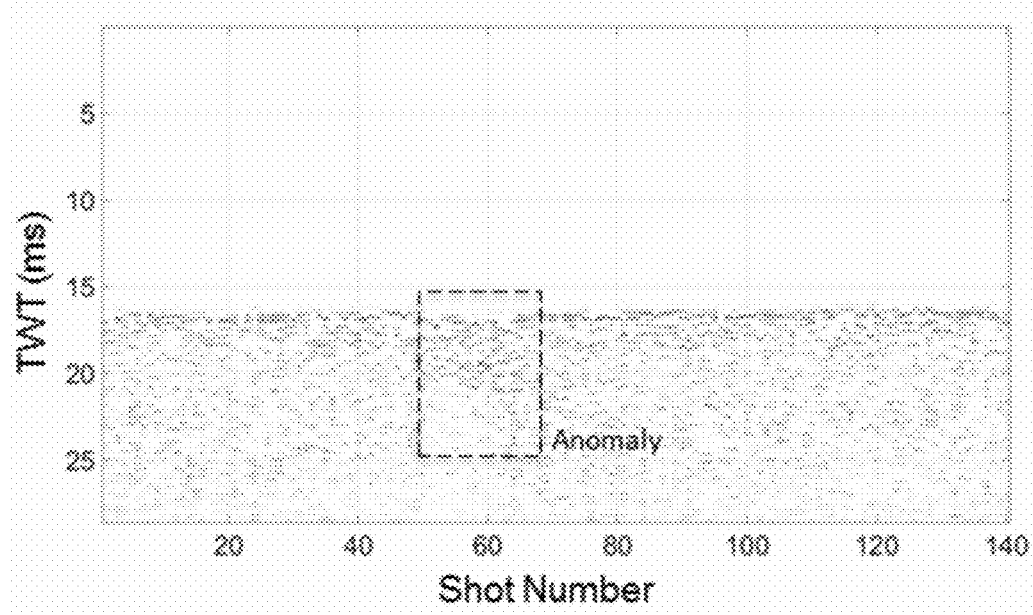
Figure 29:
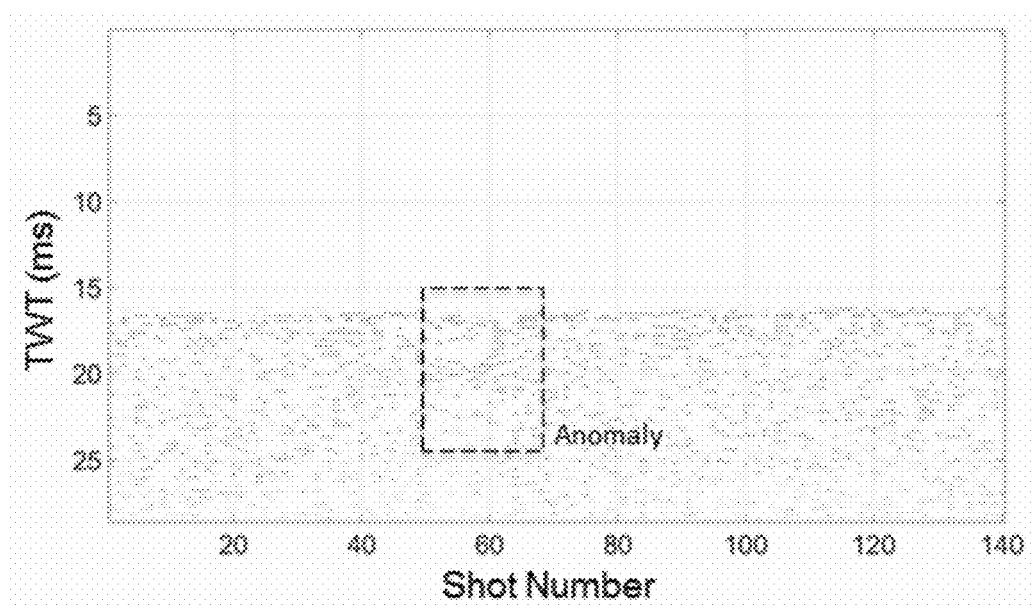

After the correction is performed in this way, the same result as in FIG. 25 may be obtained.

Referring to FIG. 25, it may be seen that the sub-bottom reflection signal portion appears flat as the influence of waviness is corrected. Also, as the muting is performed, the upper part of the sub-bottom reflection signal is removed, and as a result, the signal becomes more clearly visible.

By deconvoluting the first Klauder wavelet section and the second Klauder wavelet, which perform such corrections, deriving the physical property of the survey target (S170) is performed.

Deconvoluting will be described in detail as follows.

In general, the trace results of an elastic wave exploration are derived by adding noise to the convolution of the wavelet and physical property (e.g., reflection coefficient). Here, the reflection coefficient refers to the reflection coefficient of the strata boundary which is different from each other.

At this time, in order to obtain only the physical property value, it is necessary to perform deconvolution on the trace result of the elastic wave exploration.

In order to obtain accurate physical properties, the chirplet used for deconvolution is a very important factor. That is, in the case of deconvolution using the initial variables, the signal distortion is not considered at all so that the accurate physical property may not be obtained.

But, since the signal processing method of the raw data obtained by using the chirp sub-bottom profiler according to an embodiment of the present invention uses the comparison chirplet instead of the initial variable, the signal processing may be performed in consideration of the influence of the signal distortion. Therefore, when the signal processing method of the raw data obtained using the chirp sub-bottom profiler according to the embodiment of the present invention is used, more accurate physical properties may be obtained.

Deconvoluting may be obtaining a reflection coefficient through Sparse-Spike Deconvolution.

Sparse-Spike Deconvolution is to extract only the point with the largest reflection coefficient and display it as a spike. In other words, a portion having a smaller reflection coefficient value is made smaller, and a portion having a larger reflection coefficient value is made larger.

Especially, Sparse-Spike Deconvolution uses L1-norm, and the code is configured for Zero Phase deconvolution. Here, L1-norm is configured as follows.

The above described comparison chirplet and an arbitrary −1 to 1 reflection coefficient range are convolutional to generate a comparison trace.

The comparison trace and the trace of the raw data are subtracted from each other. At this time, if the matching is performed ideally, the minimum value is close to zero.

This is repeated to find a comparison trace with the minimum value, and the reflection coefficient used to generate the comparison trace is the reflection coefficient of the strata boundary to be obtained.

Referring to FIGS. 26 to 29, it may be seen that the layer division becomes clearer by repeating such deconvolution.

In order to confirm the effect of presence or absence of anomaly, when comparing an anomaly-free trace (FIG. 30) and an anomaly-present trace (FIG. 31), it may be seen that the reflection coefficient due to anomaly is measured at about 17 ms.

Figure 32:
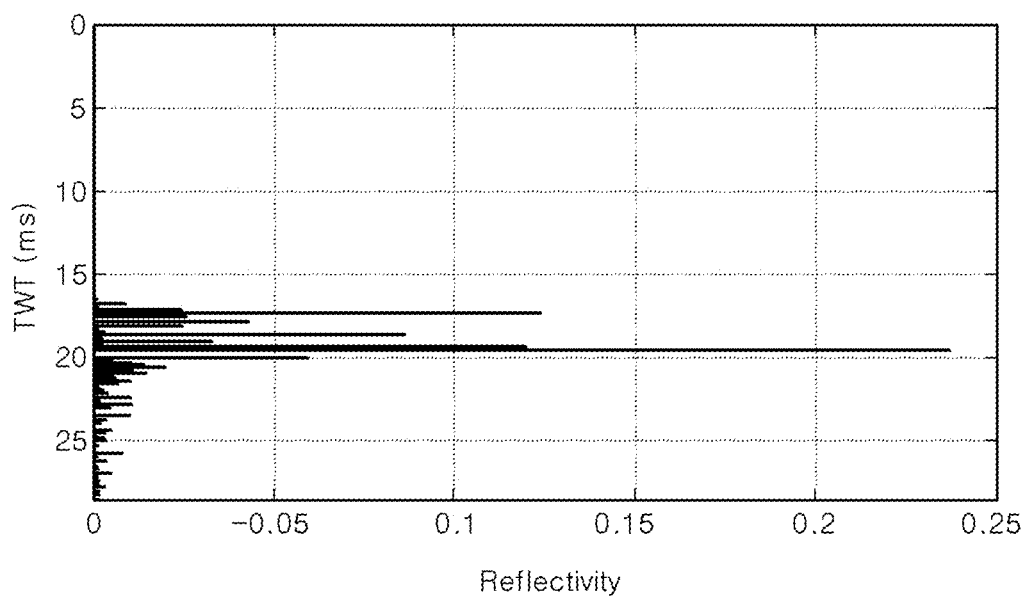
FIG. 32 shows only the positive values of the reflection coefficients in FIG. 31.

Meanwhile, in the signal processing according to the embodiment of the present invention, positive values are separately extracted and analyzed as shown in FIG. 32.

As described above, inversing after deriving the physical property of the survey target (S180) may be further performed.

For example, if the physical property is a reflection coefficient, the impedance may be derived through the inverse. That is, the interlayer impedance inversion is performed here.

The interlayer impedance inversion is performed using Equation 1.

$$Z_{n+1} = Z_n * ((1+R_n)/(1-R_n)) \quad \text{[Equation 1]}$$

(where $Z_1$ is an impedance of the seawater layer, $Z_n$ is an impedance of a sub-bottom located at the nth position with respect to the sub-bottom, and $R_n$ is a reflection coefficient of a sub-bottom located at the nth position with respect to the sub-bottom)

The impedance of a seawater layer, which is the first layer, may be obtained as follows. One layer acoustic impedance may be obtained from the product of the density of the layer and the elastic wave velocity. In this case, since the environment in which the elastic wave propagates is the ocean, the elastic wave velocity is the velocity of the P wave. In addition, the impedance of the seawater layer, which is the first layer, is $1.53 \times 10^6$ kg/m$^2$ from the fact that the velocity of the elastic wave is 1500 m/s and the density of the seawater layer is 1025 kg/m$^3$.

Therefore, the impedance of each layer located in two or more layers may be inversely calculated using the above-described Equation 1 and the reflection coefficient of each layer.

Figure 30:
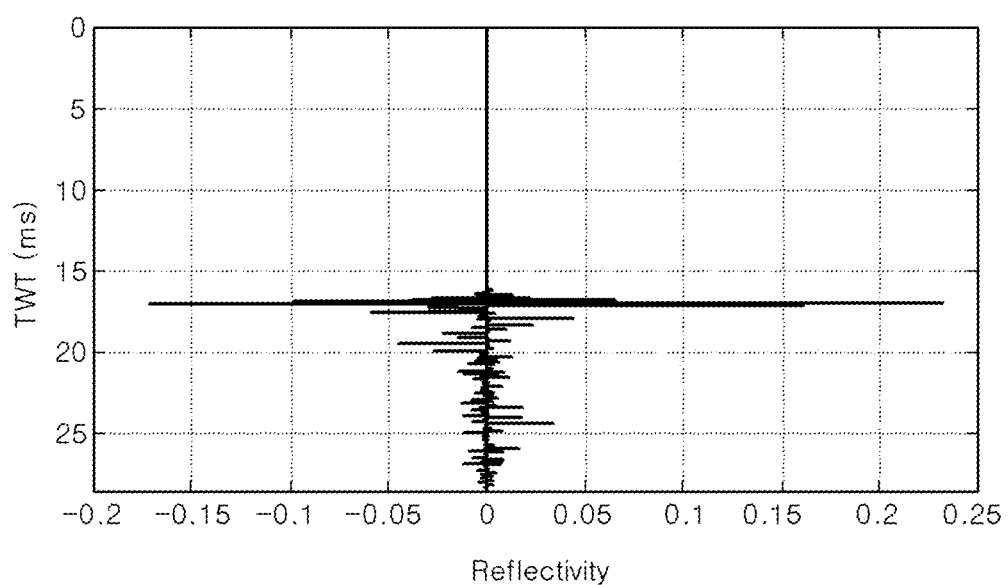
FIG. 30 is a measurement of the reflection coefficient of an anomaly-free trace using the result of convolution.
Figure 31:
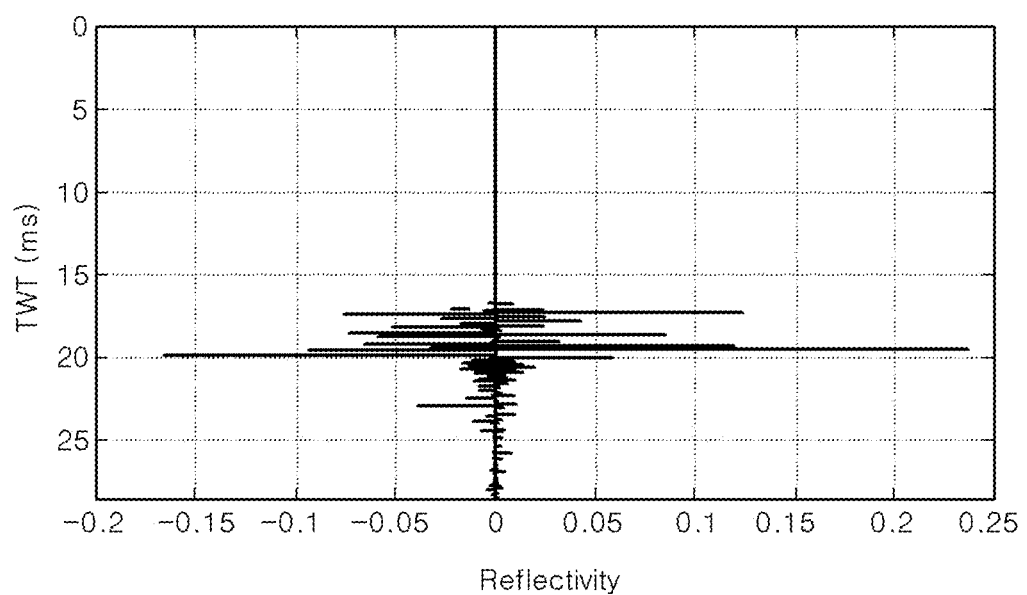
FIG. 31 is a measurement of a reflection coefficient of a trace in an area where anomaly exists using the result of convolution.
Figure 33:
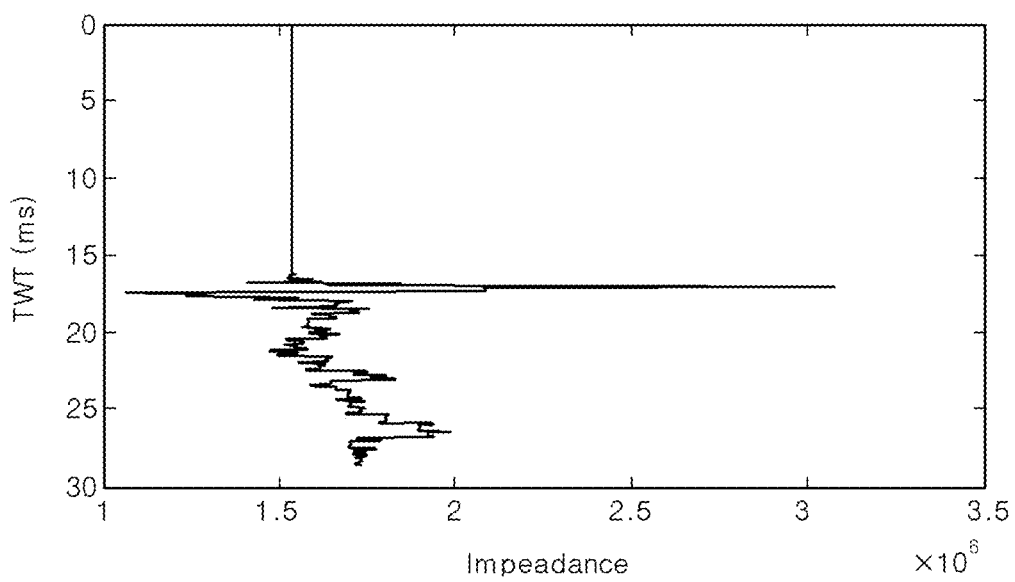
FIG. 33 is a measurement of an impedance of an area where anomaly does not exist, using the result of the comparison coefficient of FIG. 30.
Figure 34:
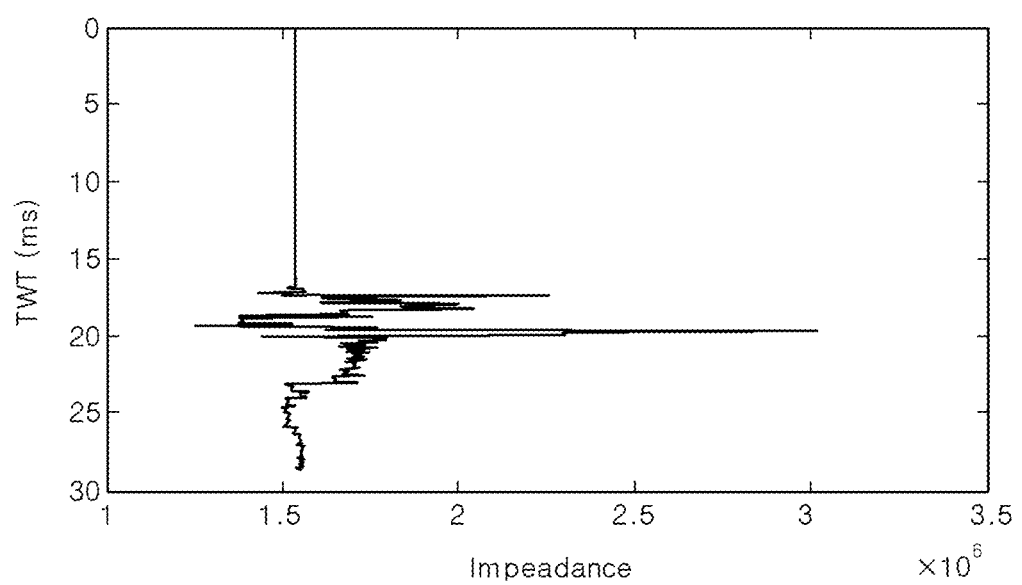
FIG. 34 is a measurement of an impedance of an area where anomaly exists, using the result of the comparison coefficient of FIG. 31.

FIG. 33 is a view for measuring an impedance of a region where anomaly does not exist, by using the result of the comparison coefficient of FIG. 30, and FIG. 34 is a diagram for measuring an impedance of a region where anomaly exists, by using the result of the comparison coefficient of FIG. 31.

Figure 35:
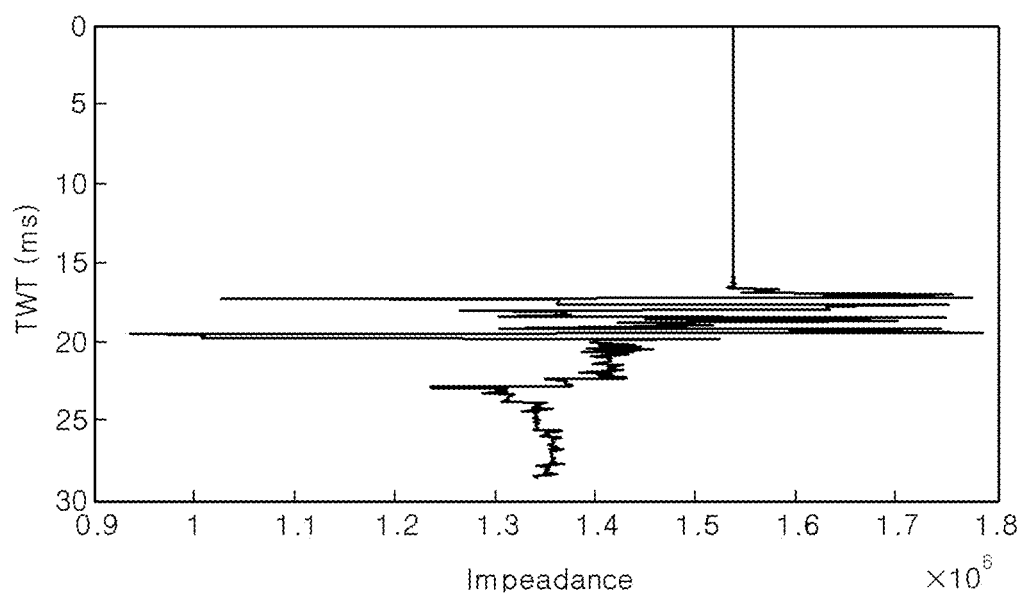
FIG. 35 is a view for measuring an impedance through the signal processing method of the raw data obtained using the chirp sub-bottom profiler of the comparative example, and for performing signal processing by using the initial setting variables used for the exploration.

Comparing FIG. 33 and FIG. 34, it may be seen that the impedance is measured to be very high at about 17 ms in FIG. 35 due to anomaly.

FIG. 35 is a view for measuring an impedance through the signal processing method of the raw data obtained using the chirp sub-bottom profiler of the comparative example, and for performing signal processing on an anomaly portion using an initial setting variable used for exploration. Note that FIGS. 34 and 35 have a difference in the scale of the X-axis.

Comparing FIG. 35 with FIG. 34, in FIG. 34, an anomaly shows a relatively higher impedance (1.3 to 3) than the impedance (1.5 to 1.7) of other portions but in FIG. 35, an anomaly shows an impedance (0.92 to 1.78) similar to the impedance (1.22 to 1.42) of other portions.

That is, when signal processing is performed using the initial setting variable, the impedance of the anomaly is similar to that of the other portion, so that it is impossible to determine what physical property an anomaly has. However, since the signal processing method according to an embodiment of the present invention uses a comparison chirplet having a modified variable by using the sub-bottom reflection signal, it is possible to clearly check the anomaly as shown in FIG. 35.

On the other hand, in order to perform the signal processing of the raw data obtained by using the chirp sub-bottom profiler, the signal processing method according to the embodiment described above may be recorded on a non-transitory computer readable recording medium so as to be readable by a computer.

The signal processing method of the raw data obtained using the chirp sub-bottom profiler according to an embodiment of the present invention has been described above.

Since a signal processing method of raw data obtained using a chirp sub-bottom profiler according to an embodiment of the present invention uses a comparison chirplet generated using a sub-bottom reflection signal, it is possible to solve problems such as waveform distortion that occur when a sub-bottom exploration is performed using a high-frequency signal.

In addition, the signal processing method of raw data obtained by using the chirp sub-bottom profiler according to an embodiment of the present invention may obtain quantitative physical property information such as reflection coefficient from raw data, and also obtain other physical property information such as impedance through additional inversion process.

Meanwhile, the signal processing method of the raw data obtained by using the chirp sub-bottom profiler according to an embodiment of the present invention removes the influence of waviness in order to prevent the data from being distorted due to the influence of waviness in a shallow water environment so that the reliability of the data may be improved.

On the other hand, even if the effects are not explicitly mentioned here, the effects described in the following specification, which are expected by the technical characteristics of the present invention, and the provisional effects thereof are handled as described in the specification of the present invention.

However, the protected scope of the present invention is not limited to the description and the expression of the embodiments explicitly described above. It is again added that the protected scope of the present invention is not limited by obvious changes or substitutions in the technical field to which the present invention belongs.

What is claimed is:

1. A method of signal processing of raw data obtained using a chirp sub-bottom profiler, the method comprising:
   (a) transmitting a chirplet (minimum frequency: initial first frequency, maximum frequency: initial second frequency, pulse length: initial pulse length) to survey target strata using a chirp sub-bottom profiler and acquiring raw data reflected and received from a target object;
   (b) correcting the raw data;
   (c) generating a comparison chirplet using a sub-bottom reflection signal of the raw data;
   (d) cross-correlating the corrected raw data with the comparison chirplet to generate a first Klauder wavelet section;
   (e) auto-correlating the comparison chirplet to generate a second Klauder wavelet; and
   (f) deriving a physical property of the survey target strata by deconvoluting the first Klauder wavelet section and the second Klauder wavelet,
   wherein the generating a comparison chirplet comprises:
   setting a first frequency band for selecting a minimum frequency, a second frequency band for selecting a maximum frequency, and a pulse length range for selecting a pulse length, which are variables necessary for generating a comparison chirplet;
   generating a plurality of first to third artificial chirplets by using one of the first frequency band, the second frequency band, and the pulse length range as a variable, cross-correlating at least one trace of the corrected raw data and the plurality of first to third artificial chirplets, and deriving and selecting a value corresponding to a maximum value of an envelope obtained by Hilbert transform as a comparison first frequency, a comparison second frequency, and a comparison pulse length; and
   generating a comparison chirplet having the comparison first frequency, the comparison second frequency, the comparison pulse length as a minimum frequency, a maximum frequency, a pulse length.

2. The method of claim 1, wherein the generating of the comparison chirplet uses a sub-bottom reflection signal in a trace area where anomaly does not exist.

3. The method of claim 1, wherein the generating of the comparison chirplet comprises:
   (1) setting a first frequency band for selecting a minimum frequency, a second frequency band for selecting a maximum frequency, and a pulse length range for selecting a pulse length, which are variables necessary for generating a comparison chirplet;
   (2) setting one selected from the first frequency band as a minimum frequency, generating, by each minimum frequency, a plurality of different first artificial chirplets (maximum frequency: initial second frequency, pulse length: initial pulse length), cross-correlating at least one trace of the raw data with the plurality of first artificial chirps, and selecting an average value of a frequency corresponding to a maximum value of an envelope obtained by the Hilbert transform as a comparison first frequency;

(3) setting one selected from the second frequency band as a maximum frequency, generating, by each maximum frequency, a plurality of different second artificial chirplets (minimum frequency: comparison first frequency, pulse length: initial pulse length), cross-correlating at least one trace of the raw data with the plurality of second artificial chirps, and selecting an average value of a frequency corresponding to a maximum value of an envelope obtained by the Hilbert transform as a comparison second frequency;

(4) setting one selected from the pulse length range as a pulse length, generating, by each pulse length, a plurality of different third artificial chirplets (minimum frequency: comparison first frequency, maximum frequency: comparison second frequency), cross-correlating at least one trace of the raw data with the plurality of third artificial chirps, and selecting an average of a pulse length corresponding to a maximum value of an envelope obtained by the Hilbert transform as a comparison pulse length; and (5) generating a comparison chirplet having the comparison first frequency, the comparison second frequency, and the comparison pulse length as a minimum frequency, a maximum frequency, and a pulse length, respectively.

4. The method of claim 1, wherein the generating of the comparison chirplet comprises:

(1) setting a first frequency band for selecting a maximum frequency, a second frequency band for selecting a minimum frequency, and a pulse length range for selecting a pulse length, which are variables necessary for generating a comparison chirplet;

(2) setting one selected from the first frequency band as a maximum frequency, generating, by each maximum frequency, a plurality of different first artificial chirplets (minimum frequency: initial first frequency, pulse length: initial pulse length), cross-correlating at least one trace of the raw data with the plurality of first artificial chirps, and selecting an average value of a frequency corresponding to a maximum value of an envelope obtained by the Hilbert transform as a comparison first frequency;

(3) setting one selected from the second frequency band as a minimum frequency, generating, by each minimum frequency, a plurality of different second artificial chirplets (maximum frequency: comparison first frequency, pulse length: initial pulse length), cross-correlating at least one trace of the raw data with the plurality of second artificial chirps, and selecting an average value of a frequency corresponding to a maximum value of an envelope obtained by the Hilbert transform as a comparison second frequency;

(4) setting one selected from the pulse length range as a pulse length, generating, by each pulse length, a plurality of different third artificial chirplets (maximum frequency: comparison first frequency, minimum frequency: comparison second frequency), cross-correlating at least one trace of the raw data with the plurality of third artificial chirps, and selecting an average of a pulse length corresponding to a maximum value of an envelope obtained by the Hilbert transform as a comparison pulse length; and (5) generating a comparison chirplet having the comparison first frequency, the comparison second frequency, and the comparison pulse length as a maximum frequency, a minimum frequency, and a pulse length, respectively.

5. The method of claim 1, wherein the physical property is a reflection coefficient obtained through Sparse-Spike Deconvolution.

6. The method of claim 5, further comprising inversing an impedance of each sub-bottom from the reflection coefficient and the equation;

$$Z_{n+1}=Z_n*((1+R_n)/(1-R_n))$$

(where $Z_1$ is an impedance of the seawater layer, $Z_n$ is an impedance of a sub-bottom located at the nth position with respect to the sub-bottom, and $R_n$ is a reflection coefficient of a sub-bottom located at the nth position with respect to the sub-bottom).

7. The method of claim 1, wherein the correcting of the raw data is performed including at least one of Highpass filtering, amplitude normalization, and automatic gain control (AGC).

8. The method of claim 1, further comprising correcting an influence of waviness with respect to the first Klauder wavelet section, wherein the correcting of the influence of the waviness comprises:

extracting an arbitrary trace having no anomaly and cross-correlating with another trace to generate an initial peaking line;

calculating a moving average value for the initial peaking line to generate a latter peaking line; and comparing the initial peaking line with the latter peaking line to move the initial peaking line based on the latter peaking line.

9. The method of claim 8, further comprising performing muting to correct a value of an upper zone of the latter peaking line to zero, wherein the muting is performed before step (f) and after the correcting of the influence of the waviness.

10. The method of claim 9, further comprising, when a generation variable of the comparison chirplet has a minimum frequency as a comparison first frequency, a maximum frequency as a second comparison frequency, and a pulse length of a comparison pulse, setting the comparison first frequency as f1, the initial first frequency as f2, the initial second frequency as f3, and the comparison second frequency as f4, and performing band pass filtering to block signals of a frequency band of f1 or less and f4 or more and passing signals of a frequency band between f2 and f3, wherein the band pass filtering is performed before step (f) and after the muting.

11. A non-transitory computer readable recording medium for recording a program for performing the method according to claim 1 so that the program is readable by a computer to perform signal processing of raw data acquired using a chirp sub-bottom profiler.

\* \* \* \* \*